(12) United States Patent
Xu et al.

(10) Patent No.: US 12,455,391 B2
(45) Date of Patent: Oct. 28, 2025

(54) RESET-TYPE CHARGE-SENSITIVE AMPLIFYING CIRCUIT, AND METHOD FOR AMPLIFYING AND RESETTING DATA SIGNAL

(71) Applicants: NANJING UNIVERSITY, Nanjing (CN); Hefei National Laboratory, Hefei (CN)

(72) Inventors: Weizong Xu, Nanjing (CN); Hao Qu, Nanjing (CN); Hai Lu, Nanjing (CN); Jiuzhou Zhao, Nanjing (CN); Dong Zhou, Nanjing (CN); Fangfang Ren, Nanjing (CN); Feng Zhou, Nanjing (CN)

(73) Assignees: NANJING UNIVERSITY, Nanjing (CN); Hefei National Laboratory, Hefei (CN)

( * ) Notice: Subject to any disclaimer, the term of this patent is extended or adjusted under 35 U.S.C. 154(b) by 0 days.

(21) Appl. No.: 19/173,746

(22) Filed: Apr. 8, 2025

(65) Prior Publication Data
US 2025/0237772 A1 Jul. 24, 2025

(30) Foreign Application Priority Data
Oct. 12, 2024 (CN) .......................... 202411421681.9

(51) Int. Cl.
*G01T 1/24* (2006.01)
(52) U.S. Cl.
CPC .................................. *G01T 1/247* (2013.01)
(58) Field of Classification Search
CPC ....................................................... G01T 1/247
See application file for complete search history.

(56) References Cited

U.S. PATENT DOCUMENTS

| 4,152,595 A | * | 5/1979 | Garfinkel | ................. H03F 3/70 |
| | | | | 250/252.1 |
| 4,160,246 A | * | 7/1979 | Martin | ................... G08B 25/10 |
| | | | | 340/630 |

(Continued)

FOREIGN PATENT DOCUMENTS

| CN | 104897708 A | 9/2015 |
| CN | 111525899 A | 8/2020 |

(Continued)

OTHER PUBLICATIONS

Chuanhao Hu et al., "Development of a charge sensitive preamplifier using source reset", The 19th National Conference on Nuclear Electronics and Nuclear Detection Technology, Oct. 15, 2018, pp. 208-213.

*Primary Examiner* — Blake C Riddick

(57) ABSTRACT

Provided are a reset-type charge-sensitive amplifying circuit, and a method for amplifying and resetting a data signal. The reset-type charge-sensitive amplifying circuit includes a signal input buffer module, a signal output amplifying module, and a reset pulse signal generation module. The signal input buffer module is connected to the signal output amplifying module, a first terminal of the signal input buffer unit is electrically connected to a semiconductor radiation detector, and a second terminal of the signal input buffer unit is electrically connected to a voltage bias unit. The signal output amplifying module is connected to the reset pulse signal generation module. The reset pulse signal generation module includes a voltage comparison unit, a reset pulse width modulation unit, and a reset pulse amplifying unit.

15 Claims, 9 Drawing Sheets

(56) References Cited

U.S. PATENT DOCUMENTS

| | | | | |
|---|---|---|---|---|
| 4,700,085 A * | 10/1987 | Miwada | G11C 19/285 | 327/73 |
| 4,764,814 A * | 8/1988 | Endo | H04N 25/625 | 348/241 |
| 4,786,831 A * | 11/1988 | Morse | H04N 25/77 | 327/51 |
| 4,956,716 A * | 9/1990 | Hewitt | H03F 3/70 | 348/E5.09 |
| 5,256,057 A * | 10/1993 | Grow | F23N 5/082 | 431/78 |
| 5,322,995 A * | 6/1994 | Ohkawa | H03F 3/082 | 327/345 |
| 5,347,231 A * | 9/1994 | Bertuccio | H03F 1/302 | 330/311 |
| 5,414,307 A * | 5/1995 | Brandmaier | G06F 1/24 | 327/143 |
| 5,790,295 A * | 8/1998 | Devon | H04B 10/114 | 330/308 |
| 5,990,745 A * | 11/1999 | Carroll | G06G 7/184 | 330/277 |
| 6,035,013 A * | 3/2000 | Orava | H04N 5/325 | 348/E3.018 |
| 6,573,762 B1 * | 6/2003 | Wessendorf | G06G 7/161 | 327/91 |
| 7,106,373 B1 * | 9/2006 | Dierickx | H04N 25/571 | 348/E3.018 |
| 7,126,386 B2 * | 10/2006 | Tumer | G01T 1/17 | 327/51 |
| 7,858,946 B2 * | 12/2010 | Rohde | G01T 1/24 | 250/370.09 |
| 7,868,665 B2 * | 1/2011 | Tumer | H03F 3/45475 | 327/51 |
| 11,397,270 B2 * | 7/2022 | Rettenmeier | G01T 1/24 | |
| 2001/0001562 A1 * | 5/2001 | Orava | H10F 39/195 | 348/E3.018 |
| 2002/0050940 A1 * | 5/2002 | Sato | H04N 1/195 | 341/122 |
| 2002/0122130 A1 * | 9/2002 | Yamaguchi | H10F 39/18 | 348/308 |
| 2002/0153957 A1 * | 10/2002 | Jordanov | H03F 3/087 | 330/308 |
| 2003/0142792 A1 * | 7/2003 | Schmidt | G01T 1/40 | 378/207 |
| 2005/0098797 A1 * | 5/2005 | Machida | H10F 39/803 | 257/187 |
| 2005/0275455 A1 * | 12/2005 | DeGeronimo | H03F 1/34 | 330/109 |
| 2005/0285043 A1 * | 12/2005 | Nascetti | H04N 25/30 | 250/370.09 |
| 2006/0066367 A1 * | 3/2006 | Zolfaghari | H03K 17/22 | 327/143 |
| 2006/0071170 A1 * | 4/2006 | Broennimann | H04N 25/773 | 250/370.09 |
| 2007/0228279 A1 * | 10/2007 | Matsumoto | G01T 1/247 | 250/336.1 |
| 2008/0116384 A1 * | 5/2008 | Drummond | G01T 1/2928 | 250/370.01 |
| 2008/0169422 A1 * | 7/2008 | Shahar | G01T 1/2928 | 250/370.09 |
| 2008/0217543 A1 * | 9/2008 | Rohde | G01T 1/24 | 250/371 |
| 2009/0290680 A1 * | 11/2009 | Tumer | G01T 1/247 | 250/311 |
| 2010/0076300 A1 * | 3/2010 | Arseneau | G01T 1/1603 | 600/411 |
| 2010/0102866 A1 * | 4/2010 | Suzuki | H03K 3/013 | 327/198 |
| 2010/0207027 A1 * | 8/2010 | Marks | H04N 25/773 | 250/336.1 |
| 2011/0121804 A1 * | 5/2011 | Kudo | H02M 3/1588 | 323/282 |
| 2011/0218432 A1 * | 9/2011 | Tumer | A61B 6/00 | 250/363.01 |
| 2011/0227632 A1 * | 9/2011 | Lotto | G01T 1/17 | 327/509 |
| 2011/0254523 A1 * | 10/2011 | Ito | G05F 1/00 | 323/282 |
| 2013/0126748 A1 * | 5/2013 | Rao | G01T 1/247 | 250/394 |
| 2013/0161492 A1 * | 6/2013 | Han | A61B 6/4241 | 330/9 |
| 2013/0265837 A1 * | 10/2013 | Kwon | G11C 29/028 | 365/194 |
| 2014/0184314 A1 * | 7/2014 | Takahashi | G01R 31/3833 | 327/524 |
| 2014/0339432 A1 * | 11/2014 | Sekine | H03F 3/082 | 250/366 |
| 2015/0256765 A1 * | 9/2015 | Shafer | G01T 1/247 | 250/370.08 |
| 2015/0326802 A1 * | 11/2015 | Kim | G01T 1/16 | 250/394 |
| 2016/0377745 A1 * | 12/2016 | Daerr | G01T 1/247 | 250/371 |
| 2017/0322324 A1 * | 11/2017 | Fu | G01T 1/244 | |
| 2018/0224564 A1 * | 8/2018 | Fu | G01T 1/247 | |
| 2018/0309948 A1 * | 10/2018 | Harada | H04N 25/77 | |
| 2019/0056517 A1 * | 2/2019 | Alving | G01T 1/244 | |
| 2019/0086561 A1 * | 3/2019 | Viswanath | G01T 1/247 | |
| 2020/0064500 A1 * | 2/2020 | Steadman Booker | H03K 5/1532 | |
| 2020/0177141 A1 * | 6/2020 | Shindoh | G01T 1/247 | |
| 2020/0225370 A1 * | 7/2020 | Viswanath | H03F 3/70 | |
| 2020/0271599 A1 * | 8/2020 | Rettenmeier | G01T 1/24 | |
| 2021/0152726 A1 * | 5/2021 | Chung | H04N 23/71 | |
| 2021/0286051 A1 * | 9/2021 | Liu | H03F 3/087 | |
| 2021/0336593 A1 * | 10/2021 | Ippolito | G06G 7/186 | |
| 2022/0011454 A1 * | 1/2022 | Shahar | G01T 1/241 | |
| 2022/0085719 A1 * | 3/2022 | Otsuka | H02M 3/1588 | |
| 2022/0345100 A1 * | 10/2022 | Rantala | G01T 1/24 | |
| 2023/0296796 A1 * | 9/2023 | Kindt | G01T 1/247 | 250/370.09 |
| 2024/0313763 A1 * | 9/2024 | Kumazawa | H03K 17/14 | |

FOREIGN PATENT DOCUMENTS

| | | |
|---|---|---|
| CN | 117155301 A | 12/2023 |
| CN | 118413202 A | 7/2024 |
| EP | 0602526 A2 | 6/1994 |

* cited by examiner

RESET-TYPE CHARGE-SENSITIVE AMPLIFYING CIRCUIT, AND METHOD FOR AMPLIFYING AND RESETTING DATA SIGNAL

CROSS-REFERENCE TO RELATED APPLICATION

This patent application claims the benefit and priority of Chinese Patent Application No. 202411421681.9 filed with the China National Intellectual Property Administration on Oct. 12, 2024, the disclosure of which is incorporated by reference herein in its entirety as part of the present application.

TECHNICAL FIELD

The present disclosure relates to the technical field of amplifying circuits, and in particular to a reset-type charge-sensitive amplifying circuit, and a method for amplifying and resetting a data signal.

BACKGROUND

Radiation detector technology has an important application prospect in the disciplinary frontier direction and industrial application direction. Amplifying circuit is an important part of the radiation detector system. The amplifying circuit in the prior art usually adopts charge-sensitive, voltage-sensitive or current sensitive amplifiers for circuit design.

In the process of implementing the above inventive concept, the inventors found that in the related art, the existing junction field-effect transistor made of a silicon material cannot operate normally in a high temperature and high irradiation environment, which leads to the technical problem that failure occurs in the amplifying circuit and the radiation detector system where the silicon-based junction field-effect transistor is located.

SUMMARY

In view of above problems, the present disclosure provides a reset-type charge-sensitive amplifying circuit, and a method for amplifying and resetting a data signal.

According to a first aspect of the present disclosure, a reset-type charge-sensitive amplifying circuit is provided, including a signal input buffer module, a signal output amplifying module, and a reset pulse signal generation module. The signal input buffer module is electrically connected to the signal output amplifying module, and includes a signal input buffer unit and a voltage bias unit. The signal input buffer unit is provided with a first terminal electrically connected to a semiconductor radiation detector and a second terminal electrically connected to the voltage bias unit, and configured for reading a first output signal output by the semiconductor radiation detector, amplifying the first output signal, and outputting a first amplified signal to the signal output amplifying module, where the first amplified signal represents a signal obtained by amplifying the first output signal. The signal output amplifying module is electrically connected to the reset pulse signal generation module, and configured to perform amplification and high-pass filtering processing on the first amplified signal to obtain and output a target signal. The reset pulse signal generation module includes a voltage comparison unit, a reset pulse width modulation unit, and a reset pulse amplifying unit. A first terminal of the voltage comparison unit is electrically connected to the signal output amplifying module, a second terminal of the voltage comparison unit is electrically connected to a first terminal of the reset pulse width modulation unit, and a second terminal of the reset pulse width module unit is electrically connected to the reset pulse amplifying unit, for outputting a high-level first control signal by the voltage comparison unit to the reset pulse width modulation unit based on the first amplified signal, and outputting a reset pulse signal by the reset pulse width modulation unit to the reset pulse amplifying unit based on the high-level first control signal to reset the reset-type charge-sensitive amplifying circuit.

According to an embodiment of the present disclosure, the signal input buffer unit includes a silicon carbide-based junction field-effect transistor and a diode. The signal input buffer unit being provided with the first terminal electrically connected to the semiconductor radiation detector and the second terminal electrically connected to the voltage bias unit, includes: the silicon carbide-based junction field-effect transistor being provided with a gate electrically connected to a first terminal of the diode and the semiconductor radiation detector, a drain electrically connected to the voltage bias unit, and a source grounded, for amplifying the first output signal to obtain the first amplified signal, and transmitting the first amplified signal to the signal output amplifying module; the diode being provided with the first terminal electrically connected to the gate of the silicon carbide-based junction field-effect transistor and the semiconductor radiation detector and a second terminal electrically connected to the second terminal of the reset pulse amplifying unit, for enabling the first terminal of the diode to be a high-level first output signal when the reset pulse signal of the second terminal of the diode is a high-pulse signal.

According to an embodiment of the present disclosure, the voltage bias unit includes a first power supply, and a first bias resistor, where the first power supply is a power supply with a constant voltage. The first power supply is configured to provide the constant voltage to the first bias resistor. The first bias resistor is provided with a first terminal electrically connected to the first power supply and a second terminal electrically connected to the drain of the silicon carbide-based junction field-effect transistor, for adjusting a bias current of the drain of the silicon carbide-based junction field-effect transistor, thus providing a stable quiescent operating point for the silicon carbide-based junction field-effect transistor.

According to an embodiment of the present disclosure, the signal output amplifying module includes a charge-sensitive amplifying unit, and a high-pass filter unit. The signal output amplifying module being electrically connected to the reset pulse signal generation module, includes: the charge-sensitive amplifying unit being provided with a first terminal electrically connected to the drain of the silicon carbide-based junction field-effect transistor and a second terminal electrically connected to the high-pass filter unit, for amplifying the first amplified signal to obtain a second amplified signal, and outputting the second amplified signal to the high-pass filter unit and the voltage comparison unit; the high-pass filter unit being electrically connected to the charge-sensitive amplifying unit, and configured to perform high-pass filtering processing on the second amplified signal, to amplify a signal after high-pass filtering processing to obtain a target signal, and to obtain and output a target signal.

According to an embodiment of the present disclosure, the high-pass filter unit includes a high-pass filtering subunit, and a first operational amplifier. The high-pass filter unit being electrically connected to the charge-sensitive amplifying unit, includes: the high-pass filtering subunit being provided with a first terminal electrically connected to the charge-sensitive amplifying unit and a second terminal electrically connected to an input terminal of the first operational amplifier, for performing high-pass filtering processing on the second amplified signal to obtain a filtered signal; the first operational amplifier being provided with the input terminal electrically connected to the second terminal of the high-pass filtering subunit and an output terminal outputting the target signal, for amplifying the filtered signal to obtain the target signal, and then outputting the target signal to an external circuit.

According to an embodiment of the present disclosure, the voltage comparison unit includes a first bias subunit, a second bias subunit, and a voltage comparator. The first terminal of the voltage comparison unit being electrically connected to the signal output amplifying module, the second terminal of the voltage comparison unit being electrically connected to the first terminal of the reset pulse width modulation unit, and the second terminal of the reset pulse width modulation unit being electrically connected to the reset pulse amplifying unit, include: the first bias subunit being provided with a first terminal electrically connected to the second terminal of the charge-sensitive amplifying unit, a second terminal grounded, and a third terminal electrically connected to a non-inverted input terminal of the voltage comparator, for performing voltage division on the second amplified signal output by the charge-sensitive amplifying unit to provide an input voltage to be compared to the voltage comparator; the second bias subunit being provided with a first terminal electrically connected to a second power supply, a second terminal grounded, and a third terminal electrically connected to an inverted input terminal of the voltage comparator, for providing a reference voltage to the inverted input terminal of the voltage comparator; the voltage comparator being provided with the non-inverted input terminal electrically connected to the third terminal of the first bias subunit, the inverted input terminal electrically connected to the third terminal of the second bias subunit, and an output terminal outputting a first control signal, for outputting a high-level first control signal to the reset pulse width modulation unit when a voltage at the non-inverted input terminal is greater than that at the inverted input terminal, and for outputting a low-level first control signal to the reset pulse width modulation unit when the voltage at the non-inverted input terminal is less than that at the inverted input terminal.

According to an embodiment of the present disclosure, the reset pulse width modulation unit includes a rising edge D-type flip flop, a timing resistor, and a timing capacitor. The second terminal of the voltage comparison unit being electrically connected to the first terminal of the reset pulse width modulation unit, and the second terminal of the reset pulse width modulation unit being electrically connected to the reset pulse amplifying unit, include: a clock port of the rising edge D-type flip flop being electrically connected to the output terminal of the voltage comparator, and a data input port of the rising edge D-type flip flop and a setting port of the rising edge D-type flip flop being electrically connected to the second power supply for maintaining high-level input states of the data input port of the rising edge D-type flip flop and the setting port of the rising edge D-type flip flop; a reset port of the rising edge D-type flip flop being electrically connected to a first terminal of the timing capacitor, an non-inverted output terminal of the rising edge D-type flip flop being electrically connected to the reset pulse amplifying unit, and an inverted output terminal of the rising edge D-type flip flop being electrically connected to a first terminal of the timing resistor, for outputting a high-level reset pulse signal by the non-inverted output terminal and outputting a low-level pulse signal by the inverted output terminal in response to a high-level first control signal received by the clock port; the timing resistor being provided with the first terminal electrically connected to the inverted output terminal of the rising edge D-type flip flop and a second terminal electrically connected to a first terminal of the timing capacitor, for facilitating the timing capacitor to discharge electricity to the timing resistor when the inverted output terminal outputs the low-level pulse signal; the timing capacitor being provided with the first terminal electrically connected to the second terminal of the timing resistor and a second terminal grounded, for discharging electricity to the timing resistor when the inverted output terminal outputs the low-level pulse signal, thus obtaining a first voltage, and for resetting the rising edge D-type flip flop when the first voltage of the timing capacitor is less than a reset input voltage of the rising edge D-type flip flop.

According to an embodiment of the present disclosure, the reset pulse amplifying unit includes a second operational amplifier, and a third bias subunit. The second terminal of the voltage comparison unit being electrically connected to the first terminal of the reset pulse width modulation unit, and the second terminal of the reset pulse width modulation unit being electrically connected to the reset pulse amplifying unit, include: the second operational amplifier being provided with a first terminal electrically connected to a first terminal of the third bias subunit and a second terminal electrically connected to the second terminal of the diode, for amplifying the reset pulse signal to obtain a target reset pulse signal, and transmitting the target reset pulse signal to the diode to conduct the diode, thereby resetting a gate voltage of the silicon carbide-based junction field-effect transistor.

A second aspect of the present disclosure provides a method for amplifying and resetting of a data signal, including: transmitting, by a semiconductor radiation detector, a first output signal to a signal input buffer module; amplifying, by the signal input buffer module, the first output signal to obtain a first amplified signal; transmitting, by the signal input buffer module, the first amplified signal to a signal output amplifying module; and performing, by the signal output amplifying module, amplification and high-pass filtering processing on the first amplified signal to output a target signal.

According to an embodiment of the present disclosure, the signal output amplifying module includes a charge-sensitive amplifying unit and a high-pass filter unit, and the method includes: amplifying, by the charge-sensitive amplifying unit, the first amplified signal to obtain a second amplified signal; transmitting, by the charge-sensitive amplifying unit, the second amplified signal to a reset pulse signal generation module; comparing, by the reset pulse signal generation module, the second amplified signal, and transmitting a target reset pulse signal to the signal input buffer module in the case that an amplitude of the second amplified signal is greater than a predetermined threshold; and resetting, by the signal input buffer module, the signal output amplifying module according to the target reset pulse signal.

According to the reset-type charge-sensitive amplifying circuit and the method for amplifying and resetting a data signal provided by the present disclosure, a signal input buffer module, a signal output amplifying module and a reset pulse signal generation module are adopted, and based on a first output signal detected by a semiconductor radiation detector and power supply, the first output signal is amplified by the signal input buffer unit of the signal input buffer module to obtain a first amplified signal, then the first amplified signal is transmitted to the signal output amplifying module, the signal output amplifying module is configured to perform secondary amplification and high-pass filtering processing on the received first amplified signal to obtain a target signal meeting an output requirement, and then the target signal is output to an external circuit. Meanwhile, based on the first amplified signal, a voltage amplitude of the first amplified signal is determined by a voltage comparison unit of the reset pulse signal generation module, when the voltage comparison unit determines that the amplitude of the first amplified signal exceeds the predetermined threshold, a high-level first control signal is output to the reset pulse width modulation unit, thereby making the reset pulse width modulation unit output a reset pulse signal to the reset pulse amplifying unit according to the high-level first control signal. The reset pulse amplifying unit is configured to amplify the received reset pulse signal to obtain a target reset pulse signal, and the target reset pulse signal is output to the signal input buffer unit to reset the reset-type charge-sensitive amplifying circuit, thus making the reset-type charge-sensitive amplifying circuit operate normally in a high temperature and high irradiation environment, preventing the amplifying circuit and radiation detector system from failing, and making the amplifying circuit and radiation detector system able to adapt to operating requirements in an extreme operating environment. Moreover, as the reset pulse width modulation unit is arranged in the reset pulse signal generation module, the reset pulse width modulation unit can output a reset pulse signal with a pulse voltage with a predetermined width according to the high-level first control signal, thereby resetting the amplifying circuit. In addition, a gate leakage current required by the reset-type charge-sensitive amplifying circuit is low, which can further reduce the noise caused by excessive gate leakage current, improve a signal-to-noise ratio of the reset-type charge-sensitive amplifying circuit, output more target signals per unit time, and improve running speed of the reset-type charge-sensitive amplifying circuit, thus responding to more intensive input signals with higher frequency in the high temperature and high irradiation environment.

BRIEF DESCRIPTION OF THE DRAWINGS

The above contents and other objectives, features and advantages of the present disclosure will be clearer from the following description of embodiments of the present disclosure with reference to the accompanying drawings. In the drawings.

DETAILED DESCRIPTION OF THE EMBODIMENTS

Figure 1:
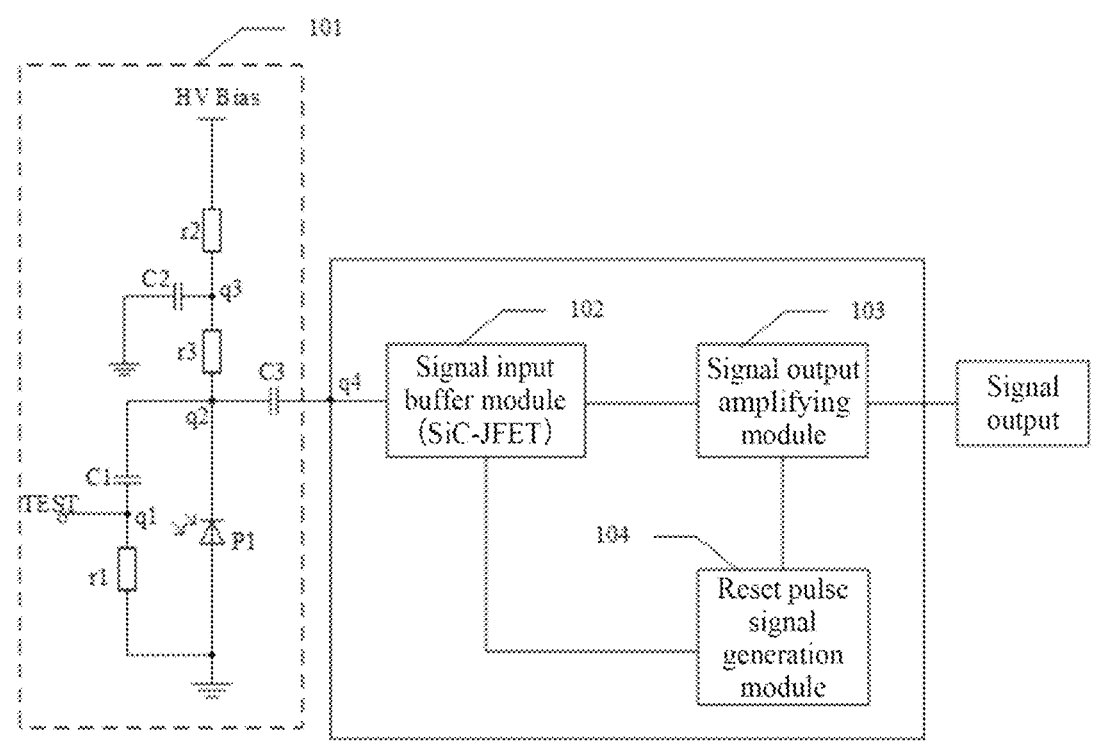
FIG. 1 is a schematic structural diagram of a reset-type charge-sensitive amplifying circuit according to an embodiment of the present disclosure.

The embodiments of the present disclosure are described below with reference to the accompanying drawings. However, it should be understood that these descriptions are only exemplary and are not intended to limit the scope of the present disclosure. In the following detailed description, for the convenience of explanation, numerous specific details are set forth to provide a comprehensive understanding of the embodiments of the present disclosure. However, apparently, one or more embodiments may also be practiced without these specific details. In addition, in the following description, the description of well-known structures and technologies are omitted to avoid unnecessarily confusing the concepts of the present disclosure.

The terminology used here is only for describing specific embodiments and is not intended to limit the present disclosure. The terms "comprising", "including" and the like used here indicate the presence of the stated features, steps, operations and/or components, but do not exclude the presence or addition of one or more other features, steps, operations, or components.

Unless otherwise specified, all of the terms used here (including the technical or scientific terms) have the meanings commonly understood by those skilled in the art. It should be noted that the terms used here should be interpreted as having the meanings consistent with the context of this specification, and should not be interpreted in an idealized or overly rigid way.

In the case of using an expression similar to "at least one of A, B and C", it should generally be interpreted according to the meaning of the expression commonly understood by those skilled in the art (for example, "a system with at least one of A, B and C" should include, but not be limited to, a system having A alone, B alone, C alone, A and B, A and C, B and C, and/or A, B and C).

In the technical solution of the present disclosure, the involved user information (including, but not limited to, user personal information, user image information, user equipment information, e.g., location information, etc.) and data (including, but not limited to, data for analysis, stored data, displayed data, etc.) are all information and data authorized by users or fully authorized by all parties, and the collection, storage, use, processing, transmission, provision, disclosure and application of relevant data all comply with relevant laws, regulations and standards, take necessary confidentiality measures, do not violate public order and good customs, and provide corresponding operation portals for users to choose authorization or rejection.

Radiation detector technology has an important application in the disciplinary frontier directions such as nuclear medicine, radio astronomy, particle physics, as well as in the industrial application directions such as nuclear power plant monitoring, environmental quality detection and chemical element analysis. In the whole radiation detector system, the design of the amplifying circuit is an important part in the integral circuit. In the amplifying circuit of the radiation detector system, the commonly used amplifiers are mainly divided into three types: a charge-sensitive amplifier, a voltage-sensitive amplifier, and a current-sensitive amplifier, among which, the charge-sensitive amplifier is widely used in a high-energy resolution measurement system due to its stable output gain, low noise and good performance.

However, the field-effect transistor in the existing reset-type charge-sensitive amplifying circuit is made of a silicon material, and the junction field-effect transistor made of the silicon material is applied to the reset-type charge-sensitive amplifying circuit, making the amplifying circuit have lower thermal noise and higher time resolution. In the process of researching the reset-type charge-sensitive amplifying circuit, the researchers found that the junction field-effect transistor made of the existing silicon material in the related art cannot operate normally in the high temperature and high irradiation environment, which leads to the technical problem that failure occurs in the amplifying circuit and the radiation detector system where the silicon-based junction field-effect transistor is located.

In view of this, an embodiment of the present disclosure provides a reset-type charge-sensitive amplifying circuit, including a signal input buffer module, a signal output amplifying module, and a reset pulse signal generation module. The signal input buffer module is electrically connected to the signal output amplifying module, and includes a signal input buffer unit and a voltage bias unit. A first terminal of the signal input buffer unit is electrically connected to a semiconductor radiation detector, and a second terminal of the signal input buffer unit is electrically connected to the voltage bias unit; and the signal input buffer unit is configured to read the first output signal output by the semiconductor radiation detector, to amplify the first output signal, and to output a first amplified signal to the signal output amplifying module, where the first amplified signal represents a signal obtained by amplifying the first output signal. The signal output amplifying module is electrically connected to the reset pulse signal generation module, and configured to perform amplification and high-pass filtering processing on the first amplified signal to obtain and output a target signal. The reset pulse signal generation module includes a voltage comparison unit, a reset pulse width modulation unit, and a reset pulse amplifying unit. A first terminal of the voltage comparison unit is electrically connected to the signal output amplifying module, a second terminal of the voltage comparison unit is electrically connected to a first terminal of the reset pulse width modulation unit, and a second terminal of the reset pulse width module unit is electrically connected to the reset pulse amplifying unit. Based on the first amplified signal, the voltage comparison unit outputs a high-level first control signal to the reset pulse width modulation unit; and based on the high-level first control signal, the reset pulse width modulation unit outputs a reset pulse signal to the reset pulse amplifying unit to reset the reset-type charge-sensitive amplifying circuit.

FIG. 1 shows a schematic structural diagram of a reset-type charge-sensitive amplifying circuit according to an embodiment of the present disclosure.

As shown in FIG. 1, the reset-type charge-sensitive amplifying circuit includes a signal input buffer module 102, a signal output amplifying module 103, and a reset pulse signal generation module 104.

According to an embodiment of the present disclosure, the signal input buffer module 102 is electrically connected to the signal output amplifying module 103, and includes a signal input buffer unit and a voltage bias unit. A first terminal of the signal input buffer unit is electrically connected to a semiconductor radiation detector 101, and a second terminal of the signal input buffer unit is electrically connected to the voltage bias unit, for reading a first output signal output by the semiconductor radiation detector 101, for amplifying the first output signal, and outputting a first amplified signal to the signal output amplifying module 103, where the first amplified signal represents a signal obtained by amplifying the first output signal.

According to an embodiment of the present disclosure, the semiconductor radiation detector 101 can represent an apparatus for detecting and measuring ionizing radiation, which includes a photodiode P1. The photodiode P1, when receiving radiation from a radiation source, generates a first output signal, and the first output signal is transmitted to the signal input buffer unit in the signal input buffer module 102.

According to an embodiment of the present disclosure, the semiconductor radiation detector 101 includes a first resistor r1, a second resistor r2, a third resistor r3, a first capacitor C1, a second capacitor C2, a third capacitor C3, a photodiode P1, and a third resistor r3.

According to an embodiment of the present disclosure, a first terminal of the first resistor r1 is connected to a first node q1, and a second terminal of the first resistor r1 is grounded. A first terminal of the first capacitor C1 is connected to the first node q1, and a second terminal of the first capacitor C1 is connected to a second node q2. A first terminal of the photodiode P1 is connected to the second node q2, and a second terminal of the photodiode P1 is grounded. A first terminal of the second resistor r2 is connected to a third power supply source HV Bias, and a second terminal of the second resistor r2 is connected to a third node q3. A first terminal of the third resistor r3 is connected to the second node q2, and a second terminal of the third resistor r3 is connected to the third node q3. A first terminal of the second capacitor C2 is connected to the third node q3, and a second terminal of the second capacitor C2 is grounded. A first terminal of the third capacitor C3 is connected to the second node q2, and a second terminal of the third capacitor C3 is connected to a fourth node q4.

According to an embodiment of the present disclosure, the first node q1 is connected to a test terminal (TEST), and the reset-type charge-sensitive amplifying circuit can be tested through the TEST.

According to an embodiment of the present disclosure, the third power supply HV Bias is configured to supply power to the semiconductor radiation detector 101, a first output signal is generated when the photodiode P1 of the semiconductor radiation detector 101 receives the radiation of the radiation source, and the first output signal in the second node q2 is transmitted to the signal input buffer module 102 via the third capacitor C3.

According to an embodiment of the present disclosure, the first terminal of the signal input buffer module 102 is connected to the fourth node q4, and the first output signal in the fourth node q4 can be output to the signal input buffer module 102.

According to an embodiment of the present disclosure, the signal output amplifying module 103 is electrically connected to the reset pulse signal generation module 104, and configured to perform amplification and high-pass filtering processing on the first amplified signal to obtain and output a target signal.

According to an embodiment of the present disclosure, a first terminal of the signal output amplifying module 103 is connected to the fourth node q4, a second terminal of the signal output amplifying module 103 is connected to a fifth node, and thus a signal in the fifth node can be output to the reset pulse signal generation module 104.

According to an embodiment of the present disclosure, the signal output amplifying module 103 can output the target signal to an external circuit, thus facilitating the external circuit to perform subsequent circuit operation according to the target signal.

According to an embodiment of the present disclosure, the reset pulse signal generation module 104 includes a voltage comparison unit, a reset pulse width modulation unit, and a reset pulse amplifying unit. A first terminal of the voltage comparison unit is electrically connected to the signal output amplifying module 103, a second terminal of the voltage comparison unit is electrically connected to a first terminal of the reset pulse width modulation unit, and a second terminal of the reset pulse width module unit is electrically connected to the reset pulse amplifying unit. Based on the first amplified signal, the voltage comparison unit outputs a high-level first control signal to the reset pulse width modulation unit; and based on the high-level first control signal, the reset pulse width modulation unit outputs a reset pulse signal to the reset pulse amplifying unit to reset the reset-type charge-sensitive amplifying circuit.

According to an embodiment of the present disclosure, a first terminal of the reset pulse signal generation module 104 is connected to the fifth node, a second terminal of the reset pulse signal generation module 104 is connected to a sixth node, and thus a target reset pulse signal in the sixth node can be transmitted to the signal input buffer module 102 to reset the amplifying circuit.

According to an embodiment of the present disclosure, a signal input buffer module 102, a signal output amplifying module 103 and a reset pulse signal generation module 104 are adopted, and based on a first output signal detected by the semiconductor radiation detector 101 and power supply, a signal input buffer unit in the signal input buffer module 102 is configured to amplify the first output signal to obtain a first amplified signal, then the first amplified signal is transmitted to the signal output amplifying module 103, the signal output amplifying module 103 is configured to perform secondary amplification and high-pass filtering processing on the received first amplified signal to obtain a target signal meeting an output requirement, and then the target signal is output to an external circuit. Meanwhile, based on the first amplified signal, a voltage comparison unit in the reset pulse signal generation module 104 is configured to determine a voltage amplitude of the first amplified signal, when the voltage comparison unit determines that the amplitude of the first amplified signal exceeds a preset threshold, a high-level first control signal is output to the reset pulse width modulation unit, thereby making the reset pulse width modulation unit output a reset pulse signal to the reset pulse amplifying unit according to the high-level first control signal. The reset pulse amplifying unit is configured to amplify the received reset pulse signal to obtain a target reset pulse signal, and the target reset pulse signal is output to the signal input buffer unit to reset the reset-type charge-sensitive amplifying circuit, thus making the reset-type charge-sensitive amplifying circuit operate normally in a high temperature and high irradiation environment, preventing the amplifying circuit and radiation detector system from failing, and making the amplifying circuit and radiation detector system able to adapt to operating requirements in an extreme operating environment. Moreover, as the reset pulse width modulation unit is arranged in the reset pulse signal generation module 104, the reset pulse width modulation unit can output a reset pulse signal with a pulse voltage of a predetermined width according to the high-level first control signal, thereby resetting the amplifying circuit. In addition, a gate leakage current required by the reset-type charge-sensitive amplifying circuit is low, which can further reduce the noise caused by excessive gate leakage current, improve a signal-to-noise ratio of the reset-type charge-sensitive amplifying circuit, output more target signals per unit time, and improve running speed of the reset-type charge-sensitive amplifying circuit, thus responding to more intensive input signals with higher frequency in the high temperature and high irradiation environment.

Figure 2:
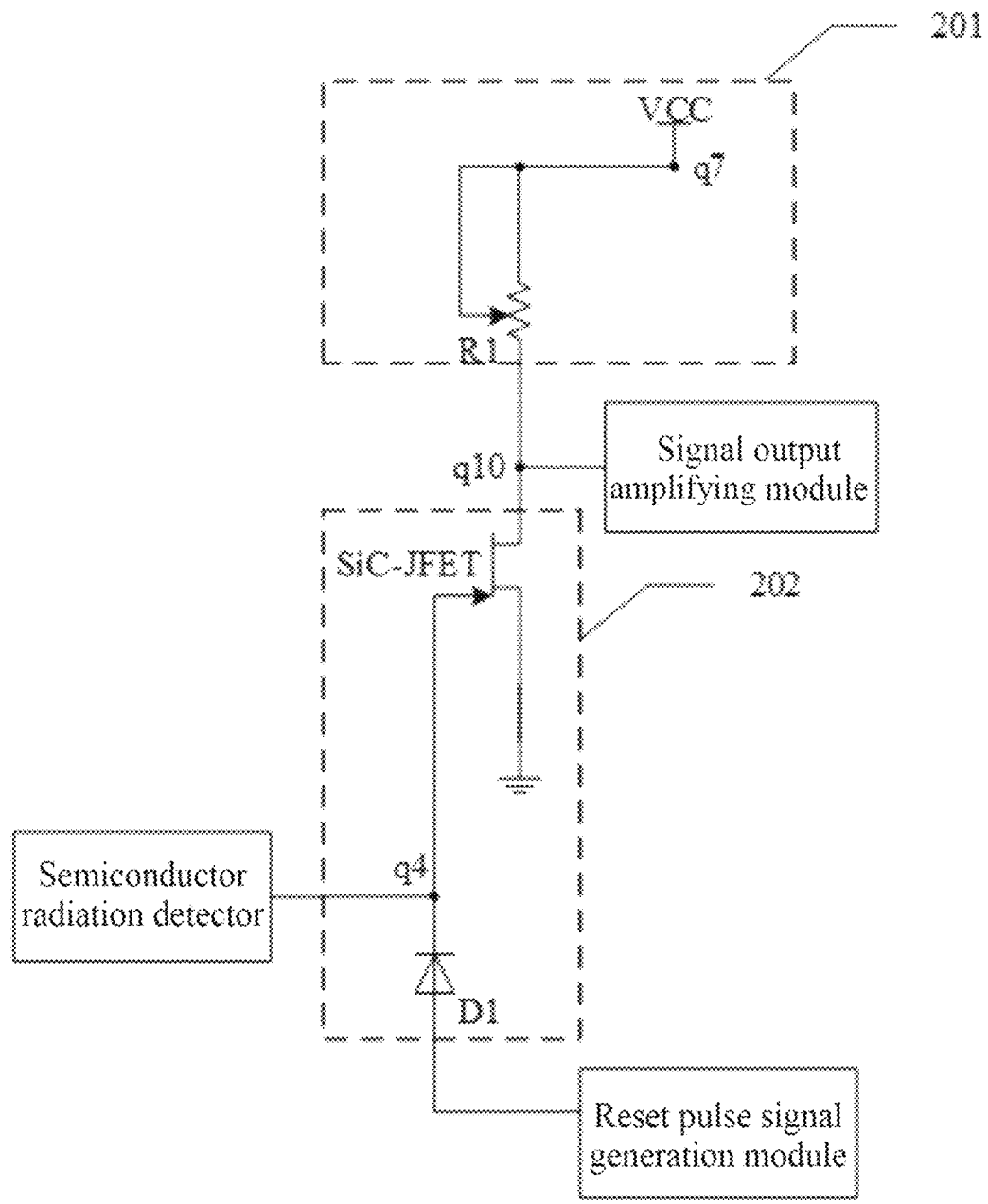
FIG. 2 is a circuit diagram of a signal input buffer module according to an embodiment of the present disclosure.

FIG. 2 shows a circuit diagram of a signal input buffer module according to an embodiment of the present disclosure.

As shown in FIG. 2, the signal input buffer module includes a signal input buffer unit 202, and a voltage bias unit 201.

According to an embodiment of the present disclosure, a first terminal of the signal input buffer unit 202 is connected to a first terminal of the voltage bias unit 201, a second terminal of the signal input buffer unit 202 is connected to the reset pulse amplifying unit, and second terminal of the voltage bias unit 201 is connected to a first power supply VCC, where the first power supply VCC is a constant-voltage source.

Figure 3:
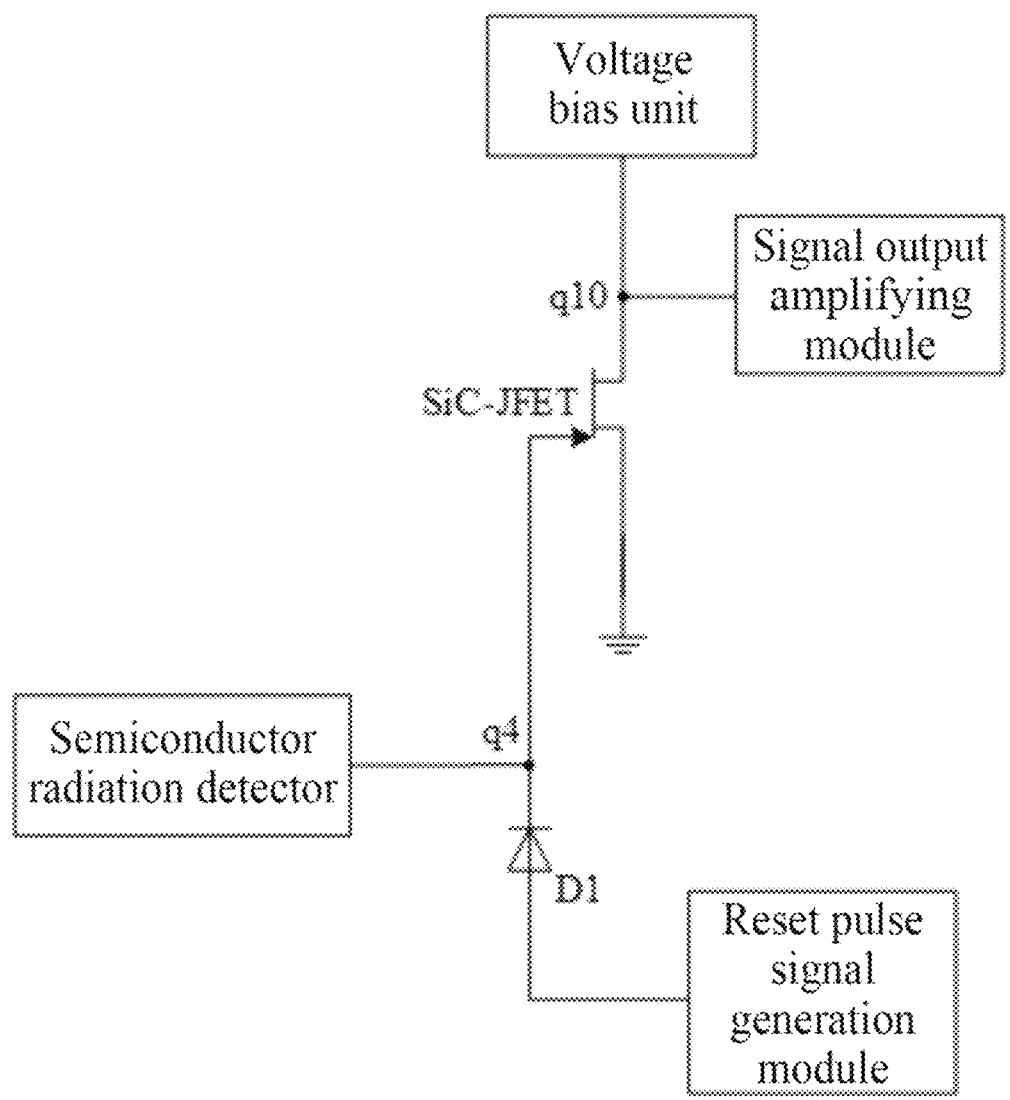
FIG. 3 is a circuit diagram of a signal input buffer unit according to an embodiment of the present disclosure.

FIG. 3 shows a circuit diagram of a signal input buffer unit according to an embodiment of the present disclosure.

As shown in FIG. 3, the signal input buffer unit includes a silicon carbide-based junction field-effect transistor (SiC-JFET), and a diode D1.

According to an embodiment of the present disclosure, the first terminal of the signal input buffer unit being electrically connected to the semiconductor radiation detector, and the second terminal of the signal input buffer unit being electrically connected to the voltage bias unit, include:

according to an embodiment of the present disclosure, a gate of the SiC-JFET being electrically connected to a first terminal of the diode D1 and the semiconductor radiation detector, a drain of the SiC-JFET being electrically connected to the voltage bias unit, and a source of the SiC-JFET is grounded, for amplifying the first output signal to obtain a first amplified signal, and outputting the first amplified signal to the signal output amplifying module.

According to an embodiment of the present disclosure, the diode D1 may be a fast recovery diode.

According to an embodiment of the present disclosure, the fourth node q4 is disposed on a circuit where the gate of the SiC-JFET is electrically connected to the first terminal of diode D1. That is, the second terminal of the third capacitor C3 is connected to the fourth node q4, the first terminal of the diode D1 is connected to the fourth node q4, the gate of the SiC-JFET is connected to the fourth node q4, and the first output signal in the fourth node q4 is transmitted to the gate of the SiC-JFET to amplify the first output signal while conducting the SiC-JFET, thus obtaining the first amplified signal, with an amplification factor ranging from 10 times to 100 times, e.g., 10 times, 20 times, 30 times, 40 times, 50 times, 60 times, 70 times, 80 times, 90 times, or 100 times.

According to an embodiment of the present disclosure, the first terminal of the diode D1 is electrically connected to the gate of the SiC-JFET and the semiconductor radiation detector, and a second terminal of the diode D1 is electrically connected to the second terminal of the reset pulse amplifying unit, so that the first terminal of the diode D1 outputs a high-level first output signal when the reset pulse signal of the second terminal of the diode D1 is a high-pulse signal.

According to an embodiment of the present disclosure, the second terminal of the diode D1 is connected to the sixth node q6, and an output terminal of the reset pulse amplifying unit is connected to the sixth node q6. When the second terminal of the reset pulse amplifying unit outputs a high-pulse target reset pulse signal to the diode D1, a voltage at the second terminal of the diode D1 is higher than a voltage at the first terminal of the diode D1, which makes the diode D1 conducted. Therefore, the first terminal of diode D1 outputs a high-level first output signal, and the high-level first output signal is transmitted to the gate of the SiC-JFET to reset the signal output amplifying module.

According to an embodiment of the present disclosure, in this embodiment, the SiC-JFET and the diode D1 are adopted, the gate of the SiC-JFET is connected to the first terminal of the diode D1, and when the first output signal is transmitted to the gate of the SiC-JFET, the first output signal is amplified by the SiC-JFET for the first time to obtain the first amplified signal. Moreover, when the second terminal of the diode D1 receives a high-pulse target reset pulse signal, voltages at both terminals of the diode D1 are changed, and the voltage at the second terminal of the diode D1 is greater than the voltage at the first terminal, which makes the diode D1 conducted, and makes the voltage of the first output signal received by the gate of the SiC-JFETT changed, thereby resetting the signal output amplifying module.

According to an embodiment of the present disclosure, by adopting the SiC-JFET, the reset-type charge-sensitive amplifying circuit can operate at a 150° C. high-temperature environment according to wide-bandgap characteristics of the SiC-JFET, and the reset-type charge-sensitive amplifying circuit can also perform circuit operation under a high irradiation environment. Meanwhile, a gate leakage current of the SiC-JFET in the reset-type charge-sensitive amplifying circuit requires only a picoampere (pA) level of current, thereby reducing noise introduced by the gate leakage current, reducing the noise of the first amplified signal output via the SiC-JFET, further enhancing the quality and accuracy of the output amplified signal, and improving the reliability and sensitivity of the reset-type charge-sensitive amplifying circuit. Moreover, due to the low gate leakage current in the present disclosure, the reset-type charge-sensitive amplifying circuit can respond to more intensive input signals with higher frequency per unit time, and then output more target signals to enhance the signal processing ability of the reset-type charge-sensitive amplifying circuit, thus making the reset-type charge-sensitive amplifying circuit able to meet the requirements of complex signal processing and application in high temperature and high irradiation environment.

According to an embodiment of the present disclosure, the voltage bias unit includes a first power supply VCC, and a first bias resistor R1, where the first power supply VCC is a power supply with a constant voltage.

According to an embodiment of the present disclosure, the first power supply VCC is configured to provide a constant voltage to the first bias resistor R1.

According to an embodiment of the present disclosure, the first power supply VCC can also be configured to supply power to the SiC-JFET and the fast recovery diode.

According to an embodiment of the present disclosure, the first power supply VCC may be connected to a seventh node q7.

According to an embodiment of the present disclosure, a first terminal of the first bias resistor R1 is electrically connected to the first power supply VCC, and a second terminal of the first bias resistor is electrically connected to the drain of the SiC-JFET, for adjusting a bias current of the drain of the SiC-JFET, thus providing a stable quiescent operating point for the SiC-JFET.

According to an embodiment of the present disclosure, the first terminal of the first bias resistor R1 may be connected to the seventh node q7, and the first power supply VCC is configured to supply power to the first bias resistor R1 and the signal input buffer unit.

According to an embodiment of the present disclosure, the first bias resistor R1 and the SiC-JFET together form a common source amplifying circuit.

According to an embodiment of the present disclosure, the first bias resistor R1 represents a rheostat with adjustable resistance. By adjusting the resistance of the first bias resistor R1, the bias current of the drain of the SiC-JFET can be adjusted, thereby making the voltages at a non-inverted input terminal and an inverted input terminal of an amplifier in the signal output amplifying module the same when the semiconductor radiation detector is not in operation.

According to an embodiment of the present disclosure, the first power supply VCC is configured to supply constant voltage to the first bias resistor R1 and other electronic devices to make the reset-type charge-sensitive amplifying circuit operate normally. Based on the first bias resistor R1 connected to the drain of the SiC-JFET, a stable quiescent operating point is provided for the SiC-JFE, thereby making an amplifier in the signal output amplifying module operate normally when the semiconductor radiator detector is not in operation.

Figure 4:
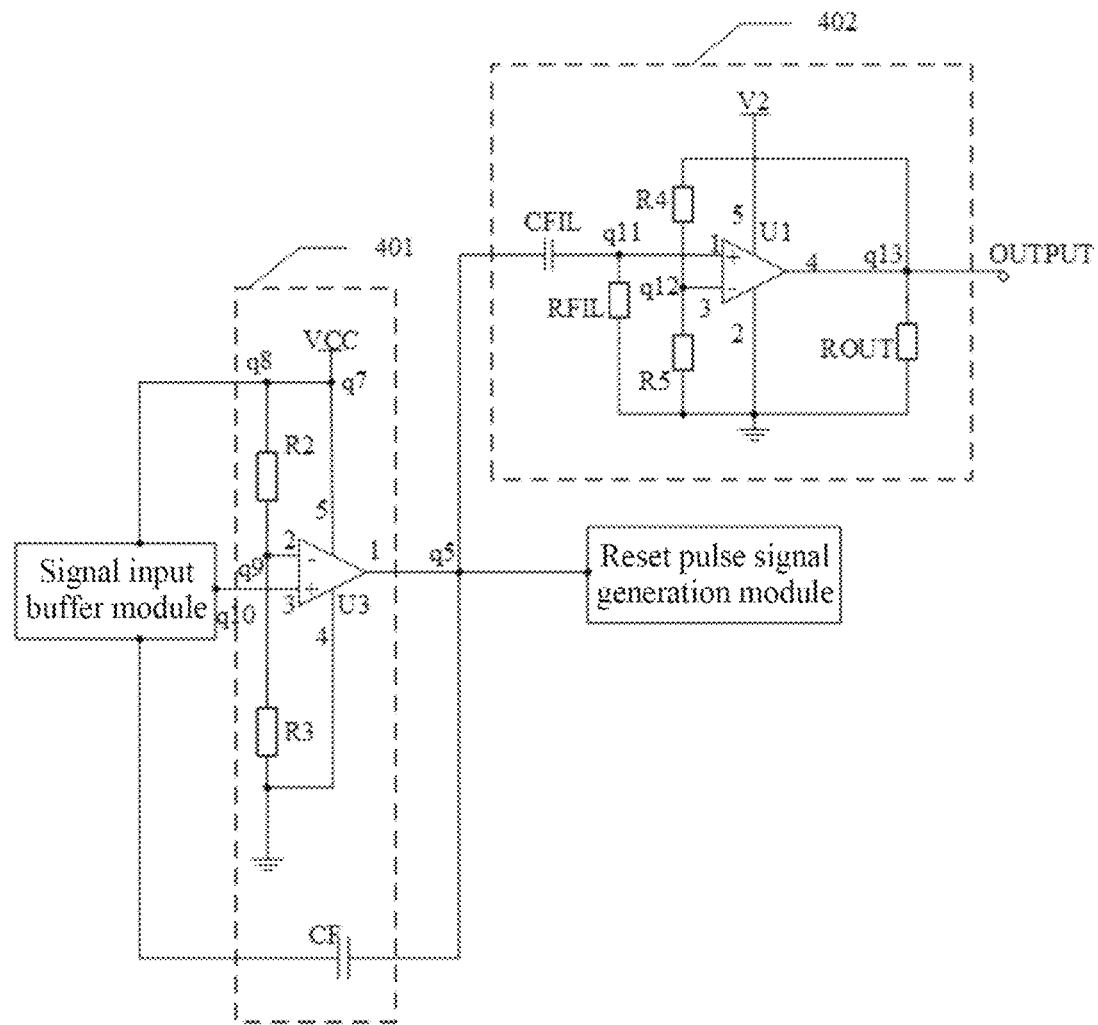
FIG. 4 is a circuit diagram of a signal output amplifying module according to an embodiment of the present disclosure.

FIG. 4 shows a circuit diagram of a signal output amplifying module according to an embodiment of the present disclosure.

As shown in FIG. 4, the signal output amplifying module includes a charge-sensitive amplifying unit 401, and a high-pass filter unit 402.

According to an embodiment of the present disclosure, the signal output amplifying module being electrically connected to the reset pulse signal generation module, includes:

according to an embodiment of the present disclosure, a first terminal of the charge-sensitive amplifying unit 401 being electrically connected to the drain of the SiC-JFET, a second terminal of the charge-sensitive amplifying unit 401 being electrically connected to the high-pass filter unit 402, for amplifying the first amplified signal to obtain a second amplified signal, and for outputting the second amplified signal to the high-pass filter unit 402 and the voltage comparison unit.

According to an embodiment of the present disclosure, the charge-sensitive amplifying unit 401 includes a third operational amplifier U3, a feedback capacitor CF, and a fourth bias subunit. The fourth bias subunit includes a second bias resistor R2, and a third bias resistor R3.

According to an embodiment of the present disclosure, there is an eight node q8 on a circuit where the first bias resistor R1 is connected to the seventh node q7, a first terminal of the second bias resistor R2 is connected to the eighth node q8, a second terminal of the second bias resistor R2 is connected to a first terminal of the third bias resistor R3, and a second terminal of the third bias resistor R3 is grounded. An inverted input terminal of the third operational amplifier U3 is connected to a ninth node q9 which is disposed on a circuit where the second terminal of the second bias resistor R2 is connected to the first terminal of the third bias resistor R3, an non-inverted input terminal of the third operational amplifier U3 is connected to a tenth node q10 which is disposed on a circuit where the second terminal of the first bias resistor R1 is electrically connected to the drain of the SiC-JFET, a third terminal of the third operational amplifier U3 is connected to the first power supply VCC, a fourth terminal of the third operational amplifier U3 is grounded, and an output terminal of the third operational amplifier U3 is connected to the fifth node q5. A first terminal of the feedback capacitor CF is connected to the fifth node q5, and a second terminal of the feedback capacitor CF is connected to the fourth node q4.

According to an embodiment of the present disclosure, the feedback capacitor CF forms a negative feedback amplifying circuit with the SiC-JFET and the charge-sensitive amplifying unit.

According to an embodiment of the present disclosure, the third operational amplifier U3 can be configured to amplify the first amplified signal to obtain the second amplified signal. The feedback capacitor CF can be configured to determine the amplification factor of the first amplified signal by the third operational amplifier U3, and the amplification factor of the first amplified signal by the third operational amplifier U3 can be calculated according to formula (1).

$$Av = \frac{-Q}{CF} \quad (1)$$

where Av may represent an amplification factor of the first amplified signal by the third operational amplifier U3, CF may represent capacitance of the feedback capacitor CF, and Q may represent the charge number of the charge output by the semiconductor radiation detector.

According to an embodiment of the present disclosure, the high-pass filter unit 402 is electrically connected to the charge-sensitive amplifying unit 401, and configured to perform high-pass filtering processing on the second amplified signal, to perform amplification processing on the signal after high-pass filtering processing to obtain and output a target signal.

According to an embodiment of the present disclosure, a first terminal of the high-pass filter unit 402 is connected to the fifth node q5, and an output terminal of the high-pass filter unit outputs the target signal.

According to an embodiment of the present disclosure, the charge-sensitive amplifying unit 401 and the high-pass filter unit 402 are adopted in this embodiment, the third operational amplifier U3 in the charge-sensitive amplifying unit amplifies the first amplified signal for the second time to obtain the second amplified signal, and transmits the second amplified signal to the high-pass filter unit 402 for high-pass filtering and amplification once more, thus obtaining and outputting the target signal.

According to an embodiment of the present disclosure, the high-pass filter unit 402 includes a high-pass filtering subunit, and a first operational amplifier U1.

According to an embodiment of the present disclosure, the high-pass filter unit 402 being electrically connected to the charge-sensitive amplifying unit, includes:

according to an embodiment of the present disclosure, a first terminal of the high-pass filtering subunit being electrically connected to the charge-sensitive amplifying unit, a second terminal of the high-pass filtering subunit being electrically connected to an input terminal of the first operational amplifier, for performing high-pass filtering processing on the second amplified signal to obtain a filtered signal.

According to an embodiment of the present disclosure, the high-pass filtering subunit includes a filter capacitor CFIL, a filter resistor RFIL, a fourth bias resistor R4, and a fifth bias resistor R5.

According to an embodiment of the present disclosure, a first terminal of the filter capacitor CFIL is connected to the fifth node q5, and a second terminal of the filter capacitor CFIL is connected to an eleventh node q11. A first terminal of the filter resistor RFIL is connected to the eleventh node q11, and a second terminal of the filter resistor RFIL is grounded. A first terminal of the fourth bias resistor R4 is connected to a twelfth node q12, and second terminal of the fourth bias resistor R4 is connected to a thirteenth node q13. A first terminal of the fifth bias resistor R5 is connected to the twelfth node q12, and a second terminal of the fifth bias resistor R5 is grounded.

According to an embodiment of the present disclosure, the input terminal of the first operational amplifier U1 is electrically connected to the second terminal of the high-pass filtering subunit, the output terminal of the first operational amplifier U1 outputs the target signal, for amplifying the filtered signal to obtain and output the target signal to the external circuit.

According to an embodiment of the present disclosure, the non-inverted input terminal of the first operational amplifier U1 is connected to the eleventh node q11, the inverted input terminal of the first operational amplifier U1 is connected to the twelfth node q12, a third terminal of the first operational amplifier U1 is connected to the second power supply V2 which is a +5 V voltage source, a fourth terminal of the first operational amplifier U1 is grounded, and an output terminal of the first operational amplifier U1 outputs the target signal.

According to an embodiment of the present disclosure, the fourth bias resistor R4 and the fifth bias resistor R5 can be configured to provide a stable quiescent operating point for the inverted input terminal of the first operational amplifier U1, the filter capacitor CFIL and the filter resistor RFIL form a high-pass filter circuit to filter the second amplified signal in a frequency domain to obtain a filtered second amplified signal, thus avoiding the influence of the output impedance change on the filtering characteristics. A cutoff frequency of the high-pass filter unit 402 can be calculated according to formula (2);

$$f = \frac{1}{2\pi * RFIL * CFIL} \quad (2)$$

where f may represent a cutoff frequency of the high-pass filter unit 402, the CFIL may represent capacitance of the filter capacitor CFIL, and RFIL may represent resistance of the filter resistor RFIL.

According to an embodiment of the present disclosure, the high-pass filter unit 402 further includes an output resistor ROUT.

According to an embodiment of the present disclosure, a first terminal of the output resistor ROUT is connected to a thirteenth node q13, and a second terminal of the output resistor ROUT is grounded.

According to an embodiment of the present disclosure, in a case of supplying power by the second power supply V2, the high-pass filter circuit, composed of the filter capacitor CFIL and the filter resistor RFIL in this embodiment, is configured to filter the second amplified signal, part of the second amplified signal which is lower than the cutoff frequency of the high-pass filter unit 402 is filtered to obtain part of second amplified signal which is higher than the cutoff frequency of the high-pass filter unit 402, and the part of second amplified signal which is higher than the cutoff frequency of the high-pass filter unit 402 is subjected to the third amplification processing to obtain the target signal meeting an output requirement, and the target signal is output to the external circuit. The high-pass filtering and amplification processing of the second amplified signal are implemented to obtain the target signal, and then the target signal is output to the external circuit.

Figure 5:
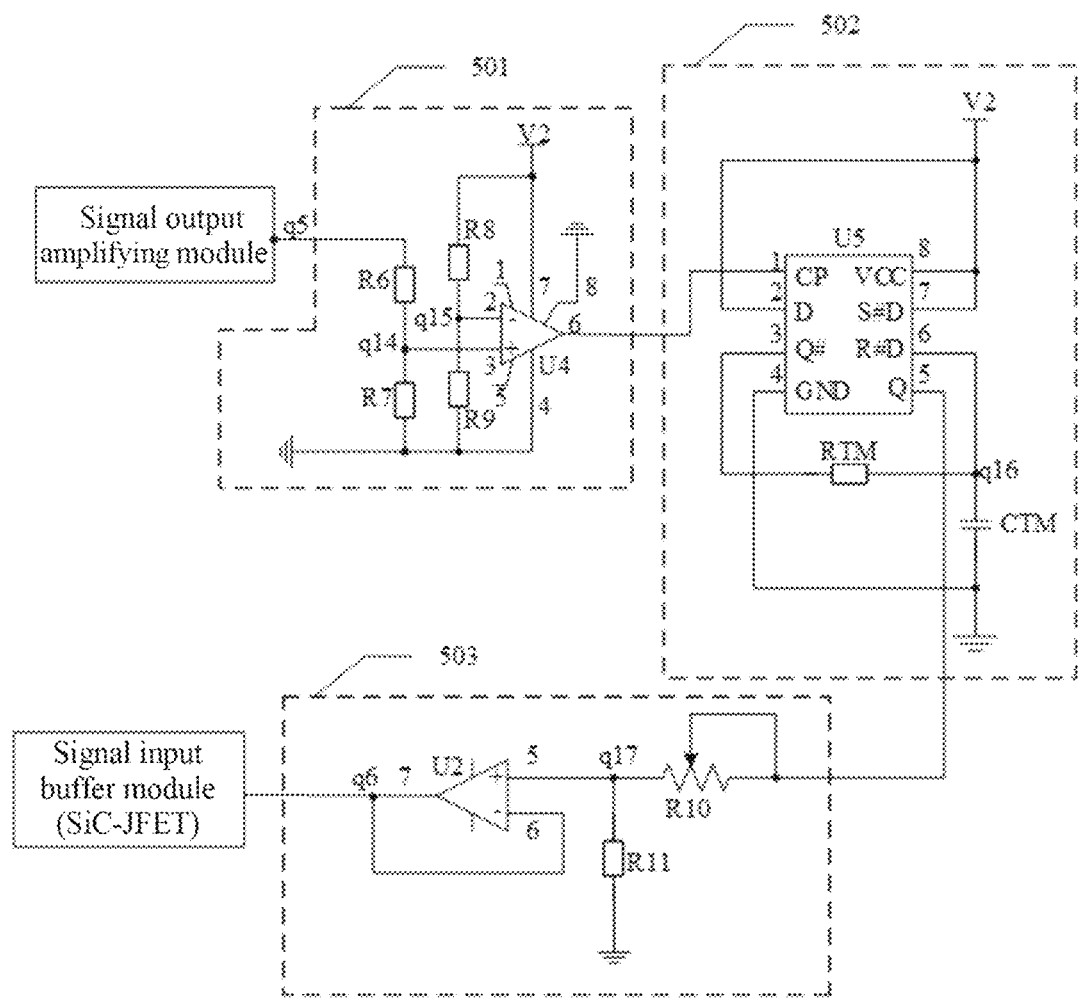
FIG. 5 is a circuit diagram of a reset pulse signal generation module according to an embodiment of the present disclosure.

FIG. 5 shows a circuit diagram of a reset pulse signal generation module according to an embodiment of the present disclosure.

As shown in FIG. 5, the reset pulse signal generation module includes a voltage comparison unit 501, a reset pulse width modulation unit 502, and a reset pulse amplifying unit 503.

According to an embodiment of the present disclosure, a first terminal of the voltage comparison unit 501 is electrically connected to the signal output amplifying module, a second terminal of the voltage comparison unit 501 is electrically connected to the first terminal of the reset pulse width modulation unit 502, and the second terminal of the reset pulse width modulation unit 502 is electrically connected to the reset pulse amplifying unit 503, where the second power supply V2 is a +5V constant-voltage source.

Figure 6:
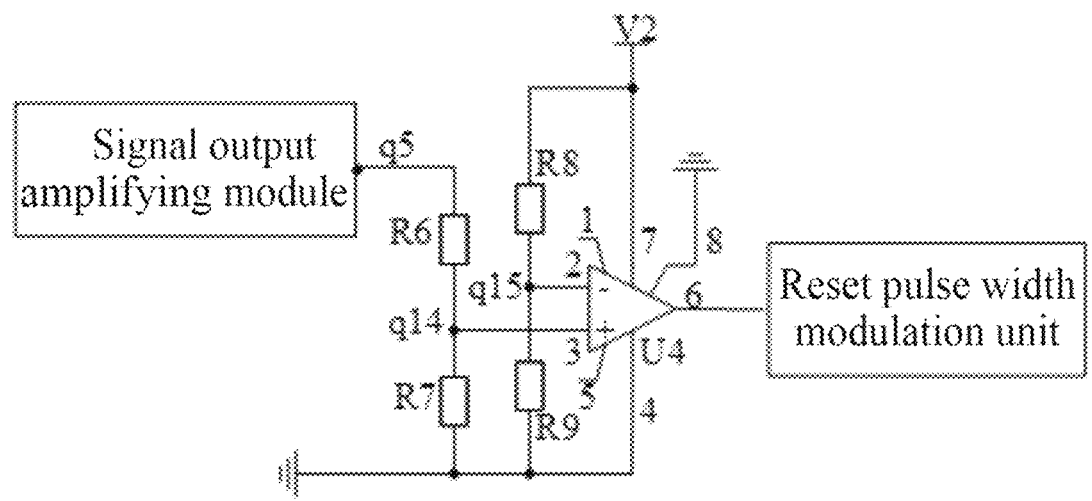
FIG. 6 is a circuit diagram of a voltage comparison unit according to an embodiment of the present disclosure.

FIG. 6 shows a circuit diagram of a voltage comparison unit according to an embodiment of the present disclosure.

As shown in FIG. 6, the voltage comparison unit includes a first bias subunit, a second bias subunit, and a voltage comparator U4.

According to an embodiment of the present disclosure, the first terminal of the voltage comparison unit being electrically connected to the signal output amplifying module, the second terminal of the voltage comparison unit being electrically connected to the first terminal of the reset pulse width modulation unit, and the second terminal of the reset pulse width modulation unit being electrically connected to the reset pulse amplifying unit, include:

according to an embodiment of the present disclosure, a first terminal of the first bias subunit being electrically connected to the second terminal of the charge-sensitive amplifying unit, a second terminal of the first bias subunit being grounded, a third terminal of the first bias subunit being electrically connected to a non-inverted input terminal of the voltage comparator U4, for performing voltage division on the second amplified signal output by the charge-sensitive amplifying unit to provide an input voltage to be compared for the voltage comparator U4.

According to an embodiment of the present disclosure, the first bias subunit includes a sixth bias resistor R6, and a seventh bias resistor R7.

According to an embodiment of the present disclosure, a first terminal of the sixth bias resistor R6 is connected to the fifth node q5, a second terminal of the sixth bias resistor R6 is electrically connected to a first terminal of the seventh bias resistor R7, and a second terminal of the seventh bias resistor R7 is grounded.

According to an embodiment of the present disclosure, the sixth bias resistor R6 and the seventh bias resistor R7 can be configured to perform voltage division on the second amplified signal output by the charge-sensitive amplifying unit to provide an input voltage to be compared for the voltage comparator U4.

According to an embodiment of the present disclosure, a first terminal of the second bias subunit is electrically connected to the second power supply V2, a second terminal of the second bias subunit is grounded, and a third terminal of the second bias subunit is electrically connected to an inverted input terminal of the voltage comparator U4, for providing a reference voltage to the inverted input terminal of the voltage comparator U4.

According to an embodiment of the present disclosure, the second bias subunit includes an eighth bias resistor R8, and a ninth bias resistor R9.

According to an embodiment of the present disclosure, a first terminal of the eighth bias resistor R8 is connected to the second power supply V2, a second terminal of the eighth bias resistor R8 is electrically connected to a first terminal of the ninth bias resistor R9, and a second terminal of the ninth bias resistor R9 is grounded.

According to an embodiment of the present disclosure, the eighth bias resistor R8 and the ninth bias resistor R9 can provide a reference voltage for the inverted input terminal of the voltage comparator U4.

According to an embodiment of the present disclosure, the non-inverted input terminal of the voltage comparator U4 is electrically connected to the third terminal of the first bias subunit, the inverted input terminal of the voltage comparator U4 is electrically connected to the third terminal of the second bias subunit, an output terminal of the voltage comparator U4 outputs a first control signal, for outputting a high-level first control signal to the reset pulse width modulation unit when the voltage at the non-inverted input terminal is greater than the voltage at the inverted input terminal, and for outputting a low-level first control signal to the reset pulse width modulation unit when the voltage at the non-inverted input terminal is less than the voltage at the inverted input terminal.

According to an embodiment of the present disclosure, the non-inverted input terminal of the voltage comparator U4 is connected to a fourteenth node q14 which is disposed on a circuit where the second terminal of the sixth bias resistor R6 is electrically connected to the first terminal of the seventh bias resistor R7, the inverted input terminal of the voltage comparator U4 is connected to a fifteenth node q15 which is disposed on a circuit where the second terminal of the eighth bias resistor R8 is electrically connected to the first terminal of the ninth bias resistor R9, a third terminal of the voltage comparator U4 is connected to the second power supply V2, a fourth terminal of the voltage comparator U4 is grounded, and an output terminal of the voltage comparator outputs the first control signal.

According to an embodiment of the present disclosure, the voltage comparator U4 can be configured to determine the voltage of the second amplified signal. If the voltage of the second amplified signal is greater than a predetermined voltage threshold, the voltage at the non-inverted input terminal of the voltage comparator U4 is greater than that at the inverted input terminal, and the voltage comparator U4 outputs a high-level first control signal. The predetermined voltage threshold is calculated according to formula (3);

$$V = \frac{(R7+R6)R9}{R7(R9+R8)} * VCC \quad (3)$$

where V may represent a predetermined voltage threshold, VCC may represent a voltage of the first power supply, R6 may represent resistance of the sixth bias resistor R6, R7 may represent resistance of the seventh bias resistor R7, R8 may represent resistance of the eighth bias resistor R8, and R9 may represent resistance of the ninth bias resistor R9.

According to an embodiment of the present disclosure, when the voltage of the second amplified signal is less than the predetermined voltage threshold, the voltage at the non-inverted input terminal of the voltage comparator U4 is less than the voltage at the inverted input terminal, and the voltage comparator U4 outputs a low-level first control signal.

According to an embodiment of the present disclosure, in a case of supplying power by the second power supply V2, the second amplified signal is transmitted to the non-inverted input terminal of the voltage comparator U4 through the third operational amplifier U3 in this embodiment, and the voltage of the second amplified signal is continuously compared and determined by the voltage comparator U4. When the voltage of the second amplified signal is greater than the predetermined voltage threshold, the voltage comparator U4 outputs the high-level first control signal, and when the voltage of the second amplified signal is less than the predetermined voltage threshold, the voltage comparator U4 outputs the low-level first control signal. The voltage of the second amplified signal is determined by the voltage comparator U4, and the first control signal for controlling the reset pulse width modulation unit is output according to the specific voltage of the second amplified signal, thereby controlling the operating state of the entire reset-type charge-sensitive amplifying circuit.

According to an embodiment of the present disclosure, the voltage of the second amplified signal is continuously monitored by the voltage comparator U4, such that the first control signal used for controlling the circuit to reset can be output flexibly according to the second amplified signal at the current moment, thus flexibly resetting the reset-type charge-sensitive amplifying circuit without setting a fixed cycle for circuit resetting. Moreover, the damage of the reset-type charge-sensitive amplifying circuit is avoided while the reset-type charge-sensitive amplifying circuit can respond to more intensive first input signal with higher frequency, thereby further improving the reliability of the reset-type charge-sensitive amplifying circuit.

Figure 7:
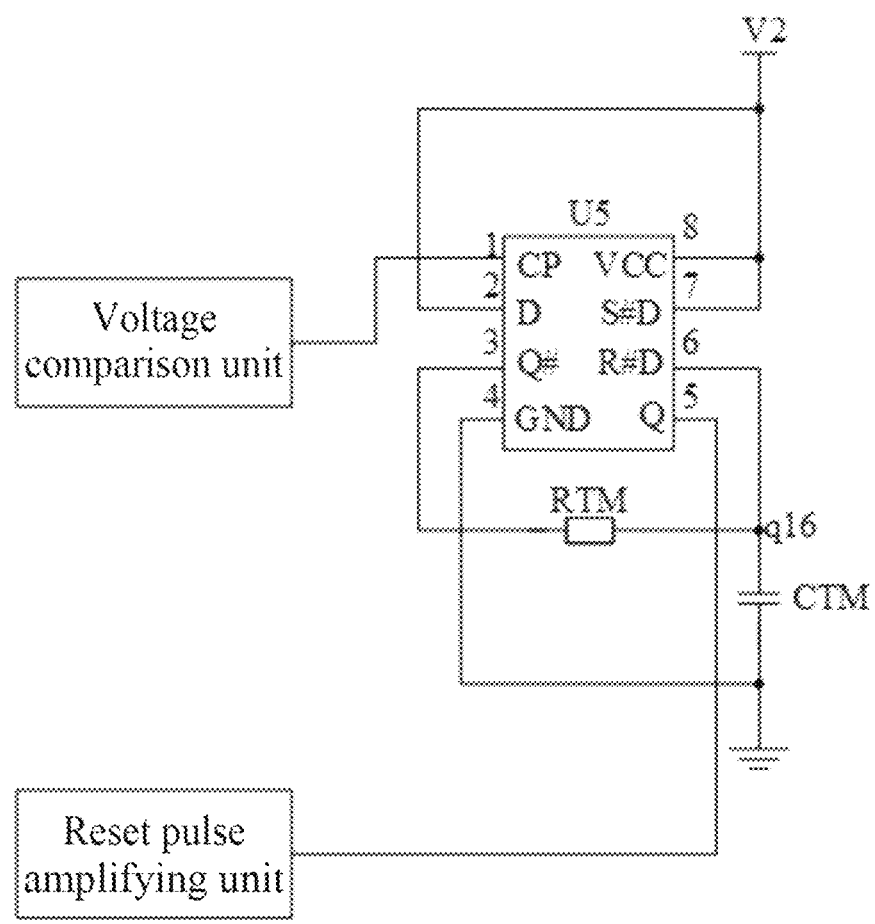
FIG. 7 is a circuit diagram of a reset pulse width modulation unit according to an embodiment of the present disclosure.

FIG. 7 shows a circuit diagram of a reset pulse width modulation unit according to an embodiment of the present disclosure.

As shown FIG. 7, the reset pulse width modulation unit includes a rising edge D-type flip flop, a timing resistor RTM, and a timing capacitor CTM.

According to an embodiment of the present disclosure, the second terminal of the voltage comparison unit being electrically connected to the first terminal of the reset pulse width modulation unit, and the second terminal of the reset pulse width modulation unit being electrically connected to the reset pulse amplifying unit, include:

according to an embodiment of the present disclosure, a clock port of the rising edge D-type flip flop being electrically connected to the output terminal of the voltage comparator U4, and a data input port of the rising edge D-type flip flop and a setting port of the rising edge D-type flip flop being electrically connected to the second power supply V2 for maintaining high-level input states of the data input port of the rising edge D-type flip flop and the setting port of the rising edge D-type flip flop; a reset port of the rising edge D-type flip flop being electrically connected to a first terminal of the timing capacitor CTM, a non-inverted output terminal of the rising edge D-type flip flop being electrically connected to the reset pulse amplifying unit, and an inverted output terminal of the rising edge D-type flip flop being electrically connected to a first terminal of the timing resistor RTM, for outputting a high-level reset pulse signal by the non-inverted output terminal and outputting a low-level pulse signal by the inverted output terminal in response to the high-level first control signal received by the clock port.

According to an embodiment of the present disclosure, when the clock port of the rising edge D-type flip flop receives the high-level first control signal, the inverted output terminal of the rising edge D-type flip flop outputs the low-level pulse signal, and the non-inverted output terminal outputs the high-level reset pulse signal, thereby controlling the reset-type charge-sensitive amplifying circuit to reset. When the clock port of the rising edge D-type flip flop receives the low-level first control signal, the inverted output terminal of the rising edge D-type flip flop outputs a high-level pulse signal, and the non-inverted output terminal of the rising edge D-type flip flop outputs a low-level reset pulse signal, thereby making the reset-type charge-sensitive amplifying circuit to maintain a normal operating state.

According to an embodiment of the present disclosure, a first terminal of the timing resistor RTM is electrically connected to the inverted output terminal of the rising edge D-type flip flop, a second terminal of the timing resistor RTM is connected a sixteenth node q16 which is disposed on a circuit where the reset port of the rising edge D-type flip flop is electrically connected to the first terminal of the timing capacitor CTM, for facilitating the timing capacitor CTM to discharge electricity to the timing resistor RTM when the inverted output terminal outputs the low-level pulse signal.

According to an embodiment of the present disclosure, the first terminal of the timing capacitor CTM is electrically connected to a second terminal of the timing resistor RTM, the second terminal of the timing capacitor CTM is grounded, for discharging electricity to the timing resistor RTM when the inverted output terminal outputs the low-level pulse signal, thus obtaining a first voltage, and for resetting the rising edge D-type flip flop when the first voltage of the timing capacitor CTM is less than a reset input voltage of the rising edge D-type flip flop.

According to an embodiment of the present disclosure, when the clock port of the rising edge D-type flip flop receives the high-level first control signal, the inverted output terminal of the rising edge D-type flip flop outputs the low-level pulse signal, the non-inverted output terminal outputs the high-level reset pulse signal, and the timing capacitor CTM discharges charge through the timing resistor RTM. When the voltage of the timing capacitor CTM is lower than the reset input voltage of the rising edge D-type flip flop, the output of the rising edge D-type flip flop flips and outputs a high-level reset pulse signal with a predetermined pulse width to the reset pulse amplifying unit, where the predetermined pulse width can be calculated according to formula (4).

$$T = RTM * CTM * \ln 3 \quad (4);$$

where T may represent a predetermined pulse width, RTM may represent resistance of the timing resistor RTM, and CTM may represent capacitance of the timing capacitor CTM.

According to an embodiment of the present disclosure, in a case of supplying power by the second power supply V2, when the rising edge D-type flip flop according to this embodiment receives the high-level first control signal, the inverted output terminal of the rising edge D-type flip flop outputs the low-level pulse signal to make the timing capacitor CTM discharge electricity through the timing resistor RTM. When the voltage across the timing capacitor CTM is lower than the reset input voltage of the rising edge D-type flip flop, the output of the rising edge D-type flip flop flips and outputs the high-level reset pulse signal with a predetermined pulse width, thus resetting the reset-type charge-sensitive amplifying circuit and outputting a new target signal.

According to an embodiment of the present disclosure, the reset pulse amplifying unit includes a second operational amplifier U2, and a third bias subunit.

According to an embodiment of the present disclosure, the second terminal of the voltage comparison unit being electrically connected to the first terminal of the reset pulse width modulation unit, and the second terminal of the reset pulse width modulation unit being electrically connected to the reset pulse amplifying unit, includes:

according to an embodiment of the present disclosure, a first terminal of the second operational amplifier U2 being electrically connected to a first terminal of the third bias subunit, a second terminal of the second operational amplifier U2 being electrically connected to the second terminal of the diode D1, for amplifying the reset pulse signal to obtain a target reset pulse signal, and transmitting the target reset pulse signal to the diode D1 to conduct the diode, thus resetting the gate voltage of the SiC-JFET.

According to an embodiment of the present disclosure, the third bias subunit includes a tenth bias resistor R10, and an eleventh bias resistor R11. The tenth bias resistor R10 is a slide rheostat with variable resistance. A first terminal of the tenth bias resistor R10 is electrically connected to the non-inverted output terminal of the rising edge D-type flip flop, and a second terminal of the tenth bias resistor R10 is connected to a seventeenth node q17. A first terminal of the eleventh bias resistor R11 is connected to the seventeenth node q17, and a second terminal of the eleventh bias resistor R11 is grounded. A non-inverted input terminal of the second operational amplifier U2 is connected to the seventeenth node q17, an inverted input terminal of the second operational amplifier U2 is connected to the sixth node q6, and the output terminal of the second operational amplifier U2 is electrically connected to the second terminal of the diode D1, where the sixth node q6 is disposed on a circuit where the output terminal of the second operational amplifier U2 is electrically connected to the second terminal of the diode D1.

According to an embodiment of the present disclosure, when the non-inverted output terminal of the rising edge D-type flip flop outputs the high-level reset pulse signal to the second operational amplifier U2, the high-level reset pulse signal is amplified by the second operational amplifier U2, thereby making a voltage at positive electrode of the diode D1 greater than a voltage at negative electrode of the diode D1. The conduction of the diode D1 makes the gate voltage of the SiC-JFET rise, the voltage at the non-inverted input terminal of the third operational amplifier U3 drop and the voltage of the second amplified signal drop, thus resetting the reset-type charge-sensitive amplifying circuit. When the non-inverted output terminal of the rising edge D-type flip flop outputs the low-level reset pulse signal to the second operational amplifier U2, the reset-type charge-sensitive amplifying circuit does not reset, but remains in an original state for normal operation.

According to an embodiment of the present disclosure, the high-level reset pulse signal is amplified based on the tenth bias resistor R10, the eleventh bias resistor R11 and the second operational amplifier U2 to achieve the conduction of the diode D1, thus resetting the reset-type charge-sensitive amplifying circuit.

Figure 8:
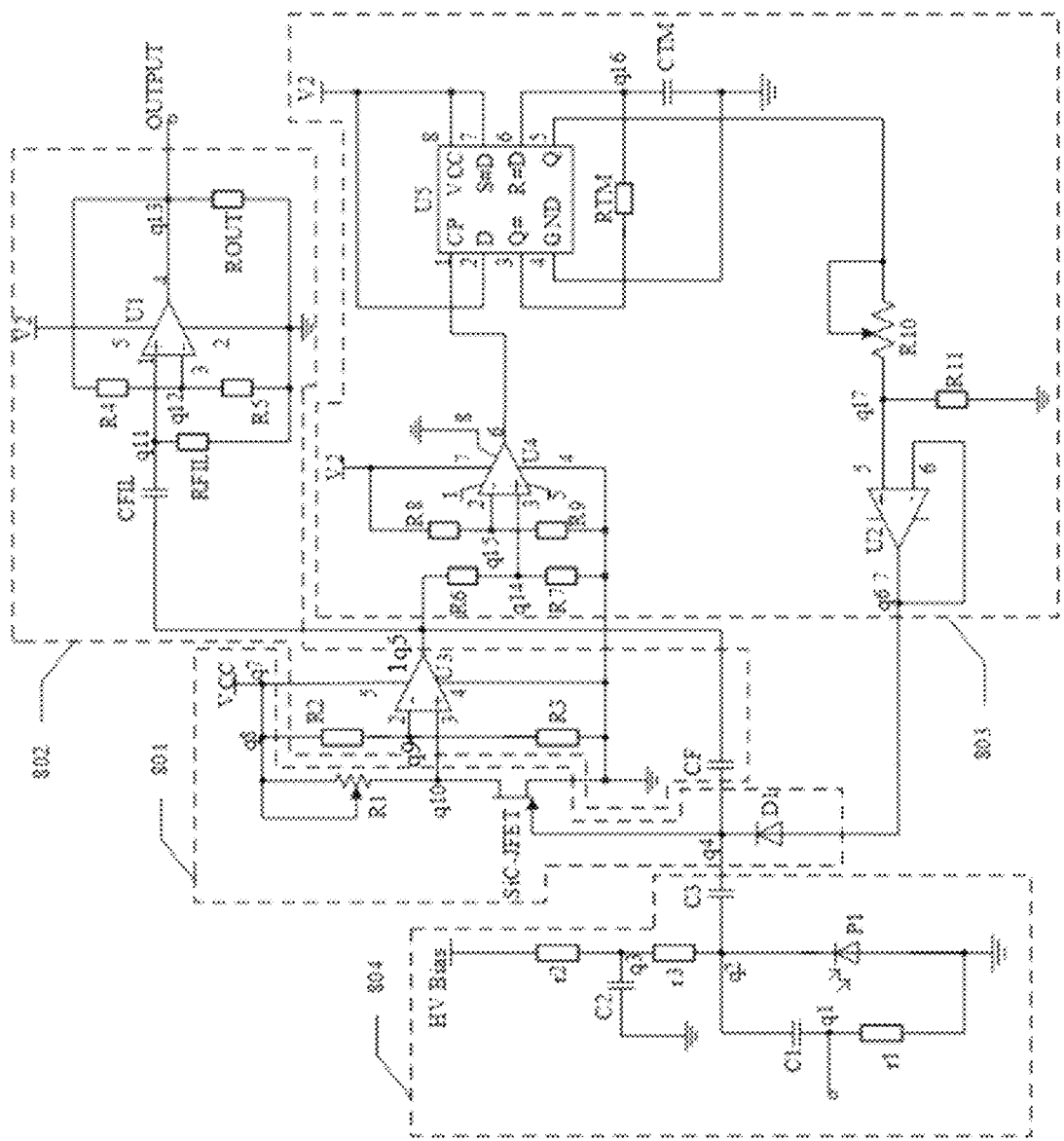
FIG. 8 is a circuit diagram of a reset-type charge-sensitive amplifying circuit according to an embodiment of the present disclosure.

FIG. 8 shows a circuit diagram of a reset-type charge-sensitive amplifying circuit according to an embodiment of the present disclosure.

As shown in FIG. 8, FIG. 8 shows a complete circuit diagram of a reset-type charge-sensitive amplifying circuit. The reset-type charge-sensitive amplifying circuit includes a signal input buffer module 801, a signal output amplifying module 802, and a reset pulse signal generation module 803. The photodiode P1 of the semiconductor radiation detector 804 generates a first output signal after receiving irradiation, and the first output signal is transmitted to the SiC-JFET. The first output signal of the gate of the SiC-JFET is amplified by a field-effect transistor to obtain a first amplified signal, and the first amplified signal is amplified by a third operational amplifier U3 for the second time to obtain a second amplified signal, and then the second amplified signal is simultaneously transmitted to a high-pass filter unit and the voltage comparison unit at the fifth node q5. The second amplified signal which is lower than the cut-off frequency is filtered by the filter capacitor CFIL and the filter resistor RFIL, and the second amplified signal which is higher than the cutoff frequency is transmitted to the first operational amplifier U1 for amplification processing, thus obtaining and outputting the target signal. Moreover, the voltage comparator U4 is configured to compare and detect the voltage of the second amplified signal.

According to an embodiment of the present disclosure, when the voltage of the second amplified signal is greater than the predetermined voltage threshold, a high-level first control signal is output to the rising edge D-type flip flop, the inverted output terminal of the rising edge D-type flip flop outputs a low-level pulse signal, the timing capacitor CTM is controlled to discharge electricity to the timing resistor RTM, the non-inverted output terminal of the rising edge D-type flip flop outputs a high-level reset pulse signal with a fixed pulse width, the high-level reset pulse signal is transmitted to the non-inverted input terminal of the second operational amplifier U2, and the second operational amplifier U2 is configured to amplify the high-level reset pulse signal to obtain a target reset pulse signal. The target reset pulse signal is transmitted to a positive electrode of the fast recovery diode D1, in this case, a voltage at the positive electrode of the fast recovery diode D1 is greater than a voltage at the negative electrode, the fast recovery diode D1 is conducted, the gate voltage of the SiC-JFET rises, the voltage at the non-inverted input terminal of the third operational amplifier U3 drops, which makes the voltage of the second amplified signal drop, thus resetting the amplifying circuit.

According to an embodiment of the present disclosure, when the voltage of the second amplified signal is less than the predetermined voltage threshold, the low-level first control signal is output to the rising edge D-type flip flop, the inverted output terminal of the rising edge D-type flip flop outputs a high-level pulse signal, the non-inverted output terminal of the rising edge D-type flip flop outputs a low-level reset pulse signal, and the low-level reset pulse signal is amplified by the second operational amplifier U2 to obtain a target reset pulse signal. The target reset pulse signal is transmitted to the positive electrode of the fast recovery diode D1, and in this case, the voltage at the positive electrode of the fast recovery diode D1 is less than the voltage at the negative electrode, the fast recovery diode D1 is turned off, the amplifying circuit does not reset, and remains a normal operation.

Figure 9:
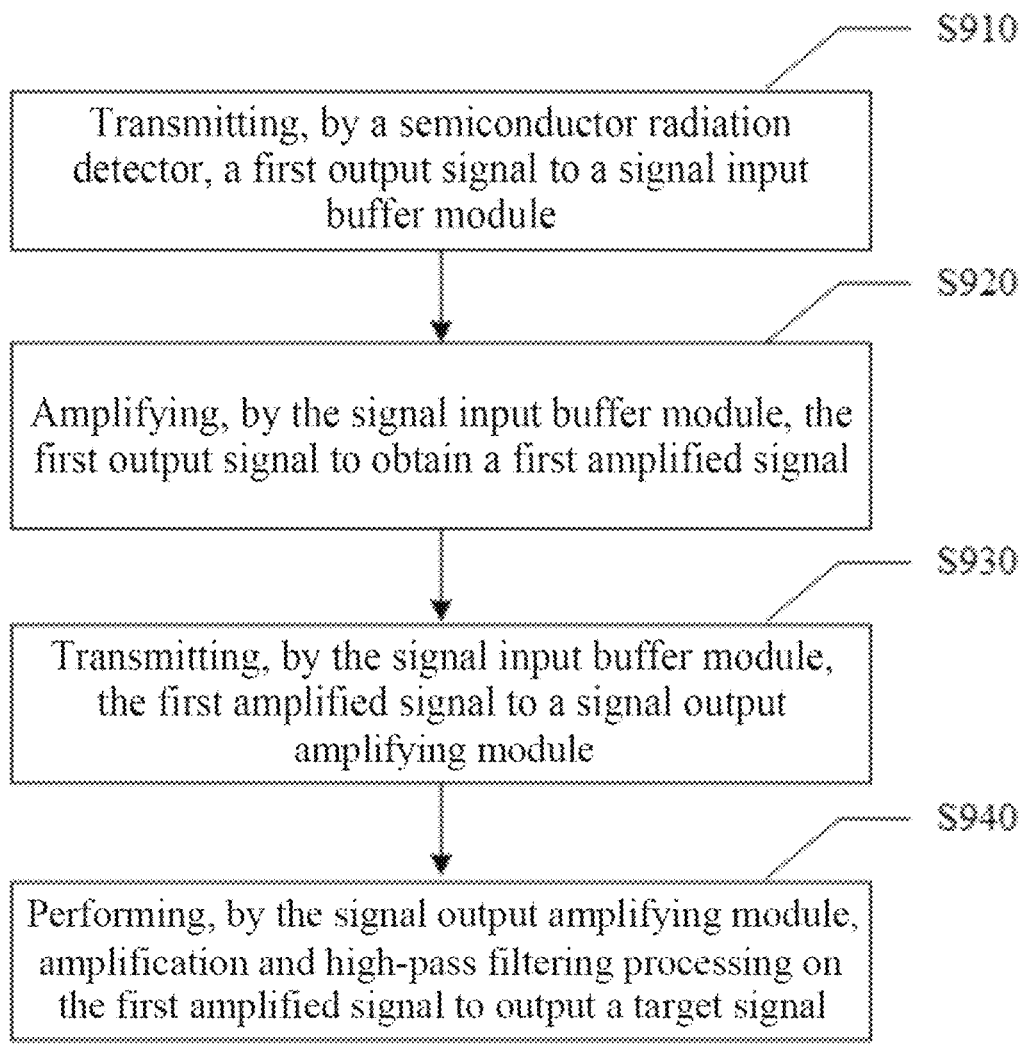
FIG. 9 is a flowchart of a method for amplifying and resetting of a data signal according to an embodiment of the present disclosure.

FIG. 9 shows a flowchart of a method for amplifying and resetting of a data signal according to an embodiment of the present disclosure.

As shown in FIG. 9, a method for amplifying and resetting a data signal in this embodiment includes operations S910-S940.

In operation S910, a first output signal is transmitted by a semiconductor radiation detector to a signal input buffer module.

In operation S920, the first output signal is amplified by the signal input buffer module to obtain a first amplified signal.

According to an embodiment of the present disclosure, the first output signal is amplified by the silicon carbide-based junction field effect transistor in the signal input buffer module to obtain the first amplified signal.

In operation S930, the first amplified signal is transmitted by the signal input buffer module to the signal output amplifying module.

In operation S940, the signal output amplifying module is configured to perform amplification and high-pass filtering processing on the first amplified signal to output a target signal.

According to an embodiment of the present disclosure, the third operational amplifier in the signal output amplifying module is configured to amplify the first amplified signal to obtain a second amplified signal, and the second amplified signal is output to the high-pass filter unit in the signal output amplifying module for high-pass filtering processing and amplification processing, where the second amplified signal which is lower than a cutoff frequency of the high-pass filter unit is filtered, while the second amplified signal higher than the cutoff frequency of the high-pass filter unit is amplified, thus obtaining and outputting the target signal.

According to an embodiment of the present disclosure, since the first output signal is transmitted by the semiconductor radiation detector to the signal input buffer module, the first output signal is amplified by the silicon carbide-based junction field effect transistor in the signal input buffer module to obtain the first amplified signal. The first amplified signal is transmitted by the signal input buffer module to the signal output amplifying module, and amplified by the third operational amplifier in the signal output amplifying module to obtain a second amplified signal. Afterwards, the second amplified signal is output to the high-pass filter unit in the signal output amplifying module for high-pass filtering processing and amplification processing to obtain and output the target signal, so that the first output signal obtained by the semiconductor radiation detector is amplified through the reset-type charge-sensitive amplifying circuit to obtain and output the target signal. Due to the adoption of the silicon carbide-based junction field effect transistor, the reset-type charge-sensitive amplifying circuit can amplify the data signal in a high temperature and high irradiation environment, and the gate leakage current required by the reset-type charge-sensitive amplifying circuit is low, which can reduce the noise caused by excessive gate leakage current, improve a signal-to-noise ratio of the reset-type charge-sensitive amplifying circuit, cause the reset-type charge-sensitive amplifying circuit to output more target signals per unit time, and improve running speed of the reset-type charge-sensitive amplifying circuit, thus causing the reset-type charge-sensitive amplifying circuit to respond to more intensive input signals with higher frequency in the high temperature and high irradiation environment.

According to an embodiment of the present disclosure, the signal output amplifying module includes a charge-sensitive amplifying unit, and a high-pass filter unit. The method for amplifying and resetting a data signal includes following operations.

According to an embodiment of the present disclosure, the first amplified signal is amplified by the charge-sensitive amplifying unit to obtain a second amplified signal.

According to an embodiment of the present disclosure, the second amplified signal is transmitted by the charge-sensitive amplifying unit to the reset pulse signal generation module.

According to an embodiment of the present disclosure, the reset pulse signal generation module is configured to compare the second amplified signal, and to transmit a target reset pulse signal to the signal input buffer module when an amplitude of the second amplified signal is greater than a predetermined voltage threshold.

According to an embodiment of the present disclosure, when the amplitude of the second amplified signal is greater than the predetermined voltage threshold, a high-level reset pulse signal is transmitted to the reset pulse amplifying unit in the reset pulse signal generation module, the high-level reset pulse signal is amplified by the reset pulse amplifying unit to obtain a target reset pulse signal, thus conducting the diode in the signal input buffer module, and resetting the amplifying circuit.

According to an embodiment of the present disclosure, when the amplitude of the second amplified signal is less than the predetermined voltage threshold, a low-level reset pulse signal is transmitted to the reset pulse amplifying unit in the reset pulse signal generation module, the diode in the signal input buffer module remains non-conductive, thereby preventing the amplifying circuit from resetting.

According to an embodiment of the present disclosure, the signal output amplifying module is reset by the signal input buffer module according to the target reset pulse signal.

According to an embodiment of the present disclosure, the first amplified signal is amplified by the charge-sensitive amplifying unit to obtain the second amplified signal, the second amplified signal is transmitted by the charge-sensitive amplifying unit to the reset pulse signal generation module. The reset pulse signal generation module is configured to compare the second amplified signal, and when the amplitude of the second amplified signal is greater than the predetermined voltage threshold, a high-level reset pulse signal is output to the reset pulse amplifying unit in the reset pulse signal generation module, the high-level reset pulse signal is amplified by the reset pulse amplifying unit to obtain the target reset pulse signal. The signal input buffer module is configured to reset the signal output amplifying module according to the target reset pulse signal. When the amplitude of the second amplified signal is less than the predetermined voltage threshold, a low-level reset pulse signal is output to the reset pulse amplifying unit in the reset pulse signal generation module, and the diode in the signal input buffer module remains non-conductive, thereby preventing the amplifying circuit from resetting and then achieving the reset of the data signal based on the reset-type charge-sensitive amplifying circuit.

According to an embodiment of the present disclosure, the voltage of the second amplified signal is continuously monitored by the reset pulse signal generation module, the target reset pulse signal for controlling the circuit to reset can be output flexibly according to the second amplified signal at the current moment, thus flexibly resetting the reset-type charge-sensitive amplifying circuit without setting a fixed cycle for circuit resetting. The reset-type charge-sensitive amplifying circuit can respond to more intensive first input signal with higher frequency, while avoiding the damage of the reset-type charge-sensitive amplifying circuit, thus further improving the reliability of the reset-type charge-sensitive amplifying circuit.

Those skilled in the art may understand that the features described in the various embodiments and/or claims of the present disclosure can be combined and/or integrated in multiple ways, even if such combinations or integrations are not explicitly described in the present disclosure. In particular, the features recited in various embodiments and/or claims of the present disclosure can be combined and/or integrated in various ways without departing from the spirit and teaching of the present disclosure. These combinations and/or integrations all fall within the scope of the present disclosure.

The embodiments of the present disclosure are described above. However, these embodiments are only exemplary and are not intended to limit the scope of the present disclosure. Although the embodiments have been described separately above, this does not mean that the measures in the embodiments cannot be used in combination. The scope of the present disclosure is defined by the appended claim and their equivalents. Those skilled in the art can make various substitutions and modifications without departing from the scope of the present disclosure, which should all fall within the scope of the present disclosure.

What is claimed is:

1. A reset-type charge-sensitive amplifying circuit, comprising a signal input buffer module, a signal output amplifying module, and a reset pulse signal generation module, wherein
the signal input buffer module is electrically connected to the signal output amplifying module, and comprises a signal input buffer unit and a voltage bias unit; the signal input buffer unit is provided with a first terminal electrically connected to a semiconductor radiation detector and a second terminal electrically connected to the voltage bias unit, and configured for reading a first output signal output by the semiconductor radiation detector, amplifying the first output signal, and outputting a first amplified signal to the signal output amplifying module, wherein the first amplified signal represents a signal obtained by amplifying the first output signal;
the signal output amplifying module is electrically connected to the reset pulse signal generation module, and configured to perform amplification and high-pass filtering processing on the first amplified signal to obtain and output a target signal;
the reset pulse signal generation module comprises a voltage comparison unit, a reset pulse width modulation unit, and a reset pulse amplifying unit; a first terminal of the voltage comparison unit is electrically connected to the signal output amplifying module, a second terminal of the voltage comparison unit is electrically connected to a first terminal of the reset pulse width modulation unit, and a second terminal of the reset pulse width module unit is electrically connected to the reset pulse amplifying unit, for, based on the first amplified signal, outputting a high-level first control signal by the voltage comparison unit to the reset pulse width modulation unit, and, based on the high-level first control signal, outputting a reset pulse signal by the reset pulse width modulation unit to the reset pulse amplifying unit to reset the reset-type charge-sensitive amplifying circuit;
wherein the signal input buffer unit comprises a silicon carbide-based junction field-effect transistor and a diode, wherein
the signal input buffer unit being provided with the first terminal electrically connected to the semiconductor radiation detector and the second terminal electrically connected to the voltage bias unit, comprises:
the silicon carbide-based junction field-effect transistor being provided with a gate electrically connected to a first terminal of the diode and the semiconductor radiation detector, a drain electrically connected to the voltage bias unit, and a source grounded, for amplifying the first output signal to obtain the first amplified signal, and transmitting the first amplified signal to the signal output amplifying module;
the diode being provided with the first terminal electrically connected to the gate of the silicon carbide-based junction field-effect transistor and the semiconductor radiation detector, and a second terminal electrically connected to a second terminal of the reset pulse amplifying unit, for enabling the first terminal of the diode to be a high-level first output signal when the reset pulse signal of the second terminal of the diode is a high-pulse signal.

2. The circuit according to claim 1, wherein the voltage bias unit comprises a first power supply, and a first bias resistor, the first power supply is a power supply with a constant voltage, wherein
the first power supply is configured to provide a constant voltage to the first bias resistor;
the first bias resistor is provided with a first terminal electrically connected to the first power supply and a second terminal electrically connected to the drain of the silicon carbide-based junction field-effect transistor, for adjusting a bias current of the drain of the silicon carbide-based junction field-effect transistor, thus providing a stable quiescent operating point for the silicon carbide-based junction field-effect transistor.

3. The circuit according to claim 1, wherein the signal output amplifying module comprises a charge-sensitive amplifying unit, and a high-pass filter unit, wherein
the signal output amplifying module being electrically connected to the reset pulse signal generation module, comprises:
the charge-sensitive amplifying unit being provided with a first terminal electrically connected to the drain of the silicon carbide-based junction field-effect transistor and a second terminal electrically connected to the high-pass filter unit, for amplifying the first amplified signal to obtain a second amplified signal, and outputting the second amplified signal to the high-pass filter unit and the voltage comparison unit;

the high-pass filter unit being electrically connected to the charge-sensitive amplifying unit, and configured to perform high-pass filtering processing on the second amplified signal, to amplify a signal after high-pass filtering processing to obtain a target signal, and to output the target signal.

4. The circuit according to claim 3, wherein the high-pass filter unit comprises a high-pass filtering subunit, and a first operational amplifier;

the high-pass filter unit being electrically connected to the charge-sensitive amplifying unit, comprises:

the high-pass filtering subunit being provided with a first terminal electrically connected to the charge-sensitive amplifying unit and a second terminal electrically connected to an input terminal of the first operational amplifier, for performing high-pass filtering processing on the second amplified signal to obtain a filtered signal;

the first operational amplifier being provided with the input terminal electrically connected to the second terminal of the high-pass filtering subunit and an output terminal outputting the target signal, for amplifying the filtered signal to obtain the target signal, and then outputting the target signal to an external circuit.

5. The circuit according to claim 1, wherein the voltage comparison unit comprises a first bias subunit, a second bias subunit, and a voltage comparator, wherein the first terminal of the voltage comparison unit being electrically connected to the signal output amplifying module, the second terminal of the voltage comparison unit being electrically connected to the first terminal of the reset pulse width modulation unit, and the second terminal of the reset pulse width modulation unit being electrically connected to the reset pulse amplifying unit, comprise:

the first bias subunit being provided with a first terminal electrically connected to the second terminal of the charge-sensitive amplifying unit, a second terminal grounded, and a third terminal electrically connected to a non-inverted input terminal of the voltage comparator, for performing voltage division on the second amplified signal output by the charge-sensitive amplifying unit to provide an input voltage to be compared to the voltage comparator;

the second bias subunit being provided with a first terminal electrically connected to a second power supply, a second terminal grounded, and a third terminal electrically connected to an inverted input terminal of the voltage comparator, for providing a reference voltage to the inverted input terminal of the voltage comparator;

the voltage comparator being provided with the non-inverted input terminal electrically connected to the third terminal of the first bias subunit, the inverted input terminal electrically connected to the third terminal of the second bias subunit, and an output terminal outputting a first control signal, for outputting a high-level first control signal to the reset pulse width modulation unit when a voltage at the non-inverted input terminal is greater than a voltage at the inverted input terminal, and for outputting a low-level first control signal to the reset pulse width modulation unit when the voltage at the non-inverted input terminal is less than that at the inverted input terminal.

6. The circuit according to claim 1, wherein the reset pulse width modulation unit comprises a rising edge D-type flip flop, a timing resistor, and a timing capacitor, wherein the second terminal of the voltage comparison unit being electrically connected to the first terminal of the reset pulse width modulation unit, and the second terminal of the reset pulse width modulation unit being electrically connected to the reset pulse amplifying unit, comprise:

a clock port of the rising edge D-type flip flop being electrically connected to the output terminal of the voltage comparator, and a data input port of the rising edge D-type flip flop and a setting port of the rising edge D-type flip flop being electrically connected to the second power supply for maintaining high-level input states of the data input port of the rising edge D-type flip flop and the setting port of the rising edge D-type flip flop; a reset port of the rising edge D-type flip flop being electrically connected to a first terminal of the timing capacitor, a non-inverted output terminal of the rising edge D-type flip flop being electrically connected to the reset pulse amplifying unit, and an inverted output terminal of the rising edge D-type flip flop being electrically connected to a first terminal of the timing resistor, for outputting a high-level reset pulse signal by the non-inverted output terminal and outputting a low-level pulse signal by the inverted output terminal in response to receiving the high-level first control signal by the clock port;

the timing resistor being provided with a first terminal electrically connected to the inverted output terminal of the rising edge D-type flip flop and a second terminal electrically connected to a first terminal of the timing capacitor, for facilitating the timing capacitor to discharge electricity to the timing resistor when the inverted output terminal outputs the low-level pulse signal;

the timing capacitor being provided with the first terminal electrically connected to the second terminal of the timing resistor and a second terminal grounded, for discharging electricity to the timing resistor when the inverted output terminal outputs the low-level pulse signal, thus obtaining a first voltage, and resetting the rising edge D-type flip flop when the first voltage of the timing capacitor is less than a reset input voltage of the rising edge D-type flip flop.

7. The circuit according to claim 1, wherein the reset pulse amplifying unit comprises a second operational amplifier, and a third bias subunit, wherein the second terminal of the voltage comparison unit being electrically connected to the first terminal of the reset pulse width modulation unit, and the second terminal of the reset pulse width modulation unit being electrically connected to the reset pulse amplifying unit, comprise:

the second operational amplifier being provided with a first terminal electrically connected to a first terminal of the third bias subunit and a second terminal electrically connected to the second terminal of the diode, for amplifying the reset pulse signal to obtain a target reset pulse signal, and transmitting the target reset pulse signal to the diode to conduct the diode, thereby resetting a gate voltage of the silicon carbide-based junction field-effect transistor.

8. A method for amplifying and resetting a data signal using the circuit according to claim 1, comprising:

transmitting, by the semiconductor radiation detector, the first output signal to the signal input buffer module;

amplifying, by the signal input buffer module, the first output signal to obtain the first amplified signal;

transmitting, by the signal input buffer module, the first amplified signal to the signal output amplifying module; and performing, by the signal output amplifying module, amplification and high-pass filtering processing on the first amplified signal to output a target signal.

9. The method according to claim 8, wherein the signal output amplifying module comprises a charge-sensitive amplifying unit and a high-pass filter unit, and the method further comprises:

amplifying, by the charge-sensitive amplifying unit, the first amplified signal to obtain a second amplified signal;

transmitting, by the charge-sensitive amplifying unit, the second amplified signal to the reset pulse signal generation module;

comparing, by the reset pulse signal generation module, the second amplified signal, and transmitting a target reset pulse signal to the signal input buffer module when an amplitude of the second amplified signal is greater than a predetermined threshold; and resetting, by the signal input buffer module, the signal output amplifying module according to the target reset pulse signal.

10. The method according to claim 8, wherein the voltage bias unit comprises a first power supply, and a first bias resistor, the first power supply is a power supply with a constant voltage, wherein the first power supply is configured to provide a constant voltage to the first bias resistor;

the first bias resistor is provided with a first terminal electrically connected to the first power supply and a second terminal electrically connected to the drain of the silicon carbide-based junction field-effect transistor, for adjusting a bias current of the drain of the silicon carbide-based junction field-effect transistor, thus providing a stable quiescent operating point for the silicon carbide-based junction field-effect transistor.

11. The method according to claim 8, wherein the signal output amplifying module comprises a charge-sensitive amplifying unit, and a high-pass filter unit, wherein the signal output amplifying module being electrically connected to the reset pulse signal generation module, comprises:

the charge-sensitive amplifying unit being provided with a first terminal electrically connected to the drain of the silicon carbide-based junction field-effect transistor and a second terminal electrically connected to the high-pass filter unit, for amplifying the first amplified signal to obtain a second amplified signal, and outputting the second amplified signal to the high-pass filter unit and the voltage comparison unit;

the high-pass filter unit being electrically connected to the charge-sensitive amplifying unit, and configured to perform high-pass filtering processing on the second amplified signal, to amplify a signal after high-pass filtering processing to obtain a target signal, and to output the target signal.

12. The method according to claim 11, wherein the high-pass filter unit comprises a high-pass filtering subunit, and a first operational amplifier;

the high-pass filter unit being electrically connected to the charge-sensitive amplifying unit, comprises:

the high-pass filtering subunit being provided with a first terminal electrically connected to the charge-sensitive amplifying unit and a second terminal electrically connected to an input terminal of the first operational amplifier, for performing high-pass filtering processing on the second amplified signal to obtain a filtered signal;

the first operational amplifier being provided with the input terminal electrically connected to the second terminal of the high-pass filtering subunit and an output terminal outputting the target signal, for amplifying the filtered signal to obtain the target signal, and then outputting the target signal to an external circuit.

13. The method according to claim 8, wherein the voltage comparison unit comprises a first bias subunit, a second bias subunit, and a voltage comparator, wherein the first terminal of the voltage comparison unit being electrically connected to the signal output amplifying module, the second terminal of the voltage comparison unit being electrically connected to the first terminal of the reset pulse width modulation unit, and the second terminal of the reset pulse width modulation unit being electrically connected to the reset pulse amplifying unit, comprise:

the first bias subunit being provided with a first terminal electrically connected to the second terminal of the charge-sensitive amplifying unit, a second terminal grounded, and a third terminal electrically connected to a non-inverted input terminal of the voltage comparator, for performing voltage division on the second amplified signal output by the charge-sensitive amplifying unit to provide an input voltage to be compared to the voltage comparator;

the second bias subunit being provided with a first terminal electrically connected to a second power supply, a second terminal grounded, and a third terminal electrically connected to an inverted input terminal of the voltage comparator, for providing a reference voltage to the inverted input terminal of the voltage comparator;

the voltage comparator being provided with the non-inverted input terminal electrically connected to the third terminal of the first bias subunit, the inverted input terminal electrically connected to the third terminal of the second bias subunit, and an output terminal outputting a first control signal, for outputting a high-level first control signal to the reset pulse width modulation unit when a voltage at the non-inverted input terminal is greater than a voltage at the inverted input terminal, and for outputting a low-level first control signal to the reset pulse width modulation unit when the voltage at the non-inverted input terminal is less than that at the inverted input terminal.

14. The method according to claim 8, wherein the reset pulse width modulation unit comprises a rising edge D-type flip flop, a timing resistor, and a timing capacitor, wherein the second terminal of the voltage comparison unit being electrically connected to the first terminal of the reset pulse width modulation unit, and the second terminal of the reset pulse width modulation unit being electrically connected to the reset pulse amplifying unit, comprise:

a clock port of the rising edge D-type flip flop being electrically connected to the output terminal of the voltage comparator, and a data input port of the rising edge D-type flip flop and a setting port of the rising edge D-type flip flop being electrically connected to the second power supply for maintaining high-level input states of the data input port of the rising edge D-type flip flop and the setting port of the rising edge D-type flip flop; a reset port of the rising edge D-type flip flop being electrically connected to a first terminal of the timing capacitor, a non-inverted output terminal of the rising edge D-type flip flop being electrically connected to the reset pulse amplifying unit, and an inverted output terminal of the rising edge D-type flip flop being electrically connected to a first terminal of the timing resistor, for outputting a high-level reset pulse signal by the non-inverted output terminal and outputting a low-level pulse signal by the inverted output terminal in response to receiving the high-level first control signal by the clock port;

the timing resistor being provided with a first terminal electrically connected to the inverted output terminal of the rising edge D-type flip flop and a second terminal electrically connected to a first terminal of the timing capacitor, for facilitating the timing capacitor to discharge electricity to the timing resistor when the inverted output terminal outputs the low-level pulse signal;

the timing capacitor being provided with the first terminal electrically connected to the second terminal of the timing resistor and a second terminal grounded, for discharging electricity to the timing resistor when the inverted output terminal outputs the low-level pulse signal, thus obtaining a first voltage, and resetting the rising edge D-type flip flop when the first voltage of the timing capacitor is less than a reset input voltage of the rising edge D-type flip flop.

15. The method according to claim 8, wherein the reset pulse amplifying unit comprises a second operational amplifier, and a third bias subunit, wherein the second terminal of the voltage comparison unit being electrically connected to the first terminal of the reset pulse width modulation unit, and the second terminal of the reset pulse width modulation unit being electrically connected to the reset pulse amplifying unit, comprise:

the second operational amplifier being provided with a first terminal electrically connected to a first terminal of the third bias subunit and a second terminal electrically connected to the second terminal of the diode, for amplifying the reset pulse signal to obtain a target reset pulse signal, and transmitting the target reset pulse signal to the diode to conduct the diode, thereby resetting a gate voltage of the silicon carbide-based junction field-effect transistor.

* * * * *